United States Patent
Iturbe Beristain et al.

(10) Patent No.: US 9,175,487 B2
(45) Date of Patent: Nov. 3, 2015

(54) SELF-CLIMBING PERIMETRIC PROTECTION SYSTEM FOR CONSTRUCTION WORKS IN BUILDINGS

(75) Inventors: Eneko Iturbe Beristain, Onati (ES); Monica Rodriguez Hidalgo, Onati (ES); Aritz Zuloaga Agirrebaltzategi, Onati (ES); Imanol Flores Ganuza, Onati (ES)

(73) Assignee: ULMA C Y E, S.COOP, Onati (ES)

( * ) Notice: Subject to any disclaimer, the term of this patent is extended or adjusted under 35 U.S.C. 154(b) by 376 days.

(21) Appl. No.: 13/041,260

(22) Filed: Mar. 4, 2011

(65) Prior Publication Data

US 2011/0214824 A1    Sep. 8, 2011

(30) Foreign Application Priority Data

Mar. 5, 2010   (EP) ..................................... 10382052

(51) Int. Cl.
*E04G 11/28* (2006.01)
*E04G 21/32* (2006.01)
(Continued)

(52) U.S. Cl.
CPC ............ *E04G 21/3219* (2013.01); *E04G 21/16* (2013.01); *E04G 11/28* (2013.01); *E04G 2003/286* (2013.01)

(58) Field of Classification Search
CPC . E04G 21/3219; E04G 21/3204; E04G 21/32; E04G 11/28; E04G 2003/286; E04G 3/32; E04G 3/325; E04G 11/20; E04G 11/22; E04G 11/24
USPC ..................... 249/18–22; 425/63, 65; 264/33; 182/2.1–2.3, 82, 141, 112; 52/122.1, 52/122.2
See application file for complete search history.

(56) References Cited

U.S. PATENT DOCUMENTS 4,016,228 A * 4/1977 Schmidt .......................... 264/33
4,892,169 A * 1/1990 Duncan .......................... 182/138
(Continued)

FOREIGN PATENT DOCUMENTS

| EP | 1899548 | 3/2008 |
|---|---|---|
| EP | 1899549 | 3/2008 |

(Continued)

OTHER PUBLICATIONS

European Search Report dated Sep. 17, 2010, issued in European Patent Application No. 10382052.8.

*Primary Examiner* — Daniel Cahn
(74) *Attorney, Agent, or Firm* — Knobbe Martens Olson & Bear LLP

(57) ABSTRACT

The invention relates to a self-climbing perimetric protection system with at least one module comprising
two masts (1) spaced out from one another and formed by two vertical channel irons (1) with U-shaped cross section between which pairs of support elements (6, 7) are immobilized in different horizontal planes;
a protection panel (2) attached to the masts;
pairs of anchors (4) comprised by respective anchoring frames (11) coupled to guiding heads (10) each comprising two mobile horizontal claws (16) which, in the closed position, brace the mast (1); and a rotational bearing rocker (13, 13') in a vertical plane between a position in which its front part (13) is rotated and supports a support element (6, 7) and a position in which it is rotated downwardly in which it allows the passage of the support elements (6, 7), the pairs of anchors being immobilized at different heights in a part of a building (5, 9) in which they support a pair of support elements (6, 7).

12 Claims, 18 Drawing Sheets

(51) Int. Cl.
*E04G 21/16* (2006.01)
*E04G 3/28* (2006.01)

(56) References Cited

U.S. PATENT DOCUMENTS

| | | | | |
|---|---|---|---|---|
| 5,161,641 | A * | 11/1992 | Nusbaum | 182/138 |
| 6,557,817 | B2 * | 5/2003 | Waldschmitt et al. | 249/20 |
| 2005/0217934 | A1 * | 10/2005 | Choo | 182/82 |
| 2007/0119116 | A1 * | 5/2007 | Arozena Bergaretxe et al. | 52/633 |
| 2009/0146041 | A1 * | 6/2009 | Schwoerer | 249/20 |
| 2009/0173574 | A1 * | 7/2009 | Hobmeier | 182/82 |
| 2011/0171336 | A1 * | 7/2011 | Schwoerer et al. | 425/63 |
| 2012/0247870 | A1 * | 10/2012 | Iturbe Beristain | 182/82 |

FOREIGN PATENT DOCUMENTS

| | | |
|---|---|---|
| EP | 1902185 | 3/2008 |
| WO | WO 2004/020766 | 3/2004 |
| WO | WO 2004020766 A1 * | 3/2004 |
| WO | WO 2007/000134 | 1/2007 |
| WO | WO 2007/000136 | 1/2007 |
| WO | WO 2007/000137 | 1/2007 |
| WO | WO 2007/036300 | 4/2007 |

* cited by examiner

A-A

B-B

SELF-CLIMBING PERIMETRIC PROTECTION SYSTEM FOR CONSTRUCTION WORKS IN BUILDINGS

RELATED APPLICATIONS

This application claims priority under 35 U.S.C. §119(a)-(d) to European Patent Application No. 10382052.8, filed Mar. 5, 2010, the content of which is incorporated herein by reference in its entirety.

TECHNICAL FIELD OF THE INVENTION

The present invention is comprised in the technical field of construction and, more particularly, in the sector of formworks and of self-climbing perimetric protections for construction works in buildings.

BACKGROUND OF THE INVENTION

The proliferation of very tall buildings, i.e., skyscrapers, in large cities has considerably improved the systems for their construction both in terms of efficiency and safety in recent years. The need to work safely at great heights and to continue working even with adverse meteorological conditions (wind or rain) has made it necessary to install in the periphery of the framing perimetric protections which safeguard the physical integrity of workers. The peripheral protections installed in the construction of the Espacio, Cristal and Sacyr towers (built by the Spanish company ULMA Construcción) in Madrid can be mentioned as an example.

These protections have historically been made with simple rails. However, the concept of protection that is currently used entirely covers framing, for example the last three framing structures being worked on, with canvas, wooden boards, wire mesh, etc. Said protections were first introduced on the market in non self-climbing versions, such as the protection system used by the Spanish company ULMA Construcción in the Sacyr tower works in Madrid. In this version, each set of the protection has to be hoisted with a crane and this took time away from the availability of the crane for performing other tasks on site. As can be concluded from the foregoing, it makes no sense to install a complex self-climbing system to lift the wall formworks of the central core of a building if the crane is later occupied for long periods of time to raise the perimetric protection. On the other hand, the automatic lifting is safer because it is not necessary for there to be people guiding the assemblies in dangerous working positions. To that end, there is currently a growing demand for the perimetric protections to be self-climbing, such that the can be lifted independently from the remaining work tasks.

To meet this demand, self-climbing formwork systems have been developed, such as, for example, those described in documents EP-A-1899548, EP-A-1899549 and EP-A-1902185. Nevertheless, there continues to be a need in the construction sector to be able to have alternative self-climbing perimetric protection systems with respect to those known which are reliable, easy and quick enough to handle and not excessively expensive.

DESCRIPTION OF THE INVENTION

The object of the present invention is a self-climbing perimetric protection system for construction works in a building comprising at least one module comprising at least two masts spaced out from one another and each one formed by two vertical channel irons open towards opposite lateral sides; a vertical protection panel attached to the masts; a plurality of pairs of support elements arranged in different horizontal planes between the vertical channel irons of the masts for supporting the masts during a phase of a hoisting process for hoisting the masts and a working phase; a plurality of pairs of anchors immobilized at different heights in a building for guiding the masts, this module being characterized in that the two vertical channel irons are vertical channel irons with U-shaped cross section with respective central sections facing one another and side sections emerging outwardly;

each anchor comprises an anchoring frame assembled in one part of the building and coupled to a guiding head comprising:

two horizontal mobile claws which, in the closed position, brace the mast by two of said side sections adjacent to the guiding head;

a bearing rocker with a front part adjacent to the mast, an intermediate part traversed by a horizontal rotation shaft and a rear part, the bearing rocker being rotational in a vertical plane between a working position in which said front part supports a support element and a release position in which it is distanced from the mast to allow at least one of the support elements to pass during the hoisting process;

a stop element against which the rear part of the bearing rocker abuts in said working position, the guiding heads of at least part of the pairs of anchors being arranged in horizontal planes in which they support at least one pair of support elements in said hoisting process for hoisting the mast.

The transmission of horizontal forces from the climbing assemblies to the anchoring frames and the guidance of the masts are done by means of the mentioned claws which brace the side sections of the mast and thus make it impossible for the module to move horizontally and in turn allow the masts to slide vertically.

According to the invention, the pairs of support elements of the module can be configured by way of blocks and comprise at least one pair of support reinforced elements resting on the front parts of the rockers of the heads (10) of a pair of anchors when the module is immobilized in the building. These reinforced elements are similar to the other support elements but more resistant, since they are designed for working conditions according to which they must support the entire assembly in the working and out of service conditions, whereas the other support elements directly intervene in self-climbing.

According to the invention, in addition to carrying out the functions of guiding and support of the protection panel, and being versatile for the configuration of different structures, the masts can be configured according to the "rigid mast" or "articulated mast" concept. Depending on the variation of the geometry of the slabs of the building, the mast will have to be shaped according to one of these two configurations. If the hoisting run to be made by the panel along the building is straight, the mast can be completely rigid. In contrast, when there is a variation of the slabs and the panel has to zigzag during the hoisting in order to be adapted, the mast is preferably articulated. Saving exceptional cases, the anchors are placed in the same position from the end of the slabs, so if this end varies, the mast and therefore the entire module has to be adapted.

According to the invention, the guiding head of the module can comprise two vertical side plates spaced out from and attached to one another, in which case the anchoring frame comprises a pair of vertical lugs coupled to the side plates by means of a connecting bolt traversing aligned openings respectively provided in the side plates and in the lugs. Likewise, in this case, the guiding head comprises complementary stop elements with which bearing elements of the lugs of the anchoring frame abut.

The coupling between the guiding head and the support frame can be carried out, for example, in respective rear projecting parts of the side plates through which the connecting bolt passes. These rear projecting parts can be externally braced by the lugs of the anchoring frame. These lugs can comprise respective upper edges which abut with respective bearing ribs laterally emerging from the side plates of the guiding head. Likewise, the lugs can furthermore comprise respective lower parts inclined backwards which are attached at the lower part by a horizontal locking stop which abuts with respective rear lower sections of the side plates of the guiding head.

The side plates of the guiding head can be attached to one another by means of an upper horizontal plate and a lower horizontal plate located in respective horizontal recesses of the side plates, such that the mobile claws can comprise respective first end parts articulated to one another at a common vertical rotation shaft traversing first aligned vertical openings in said horizontal plates and at the first end parts of the two horizontal plates. In this case, in the respective central parts, the mobile claws are provided with respective vertical through-holes which, in the closed position of the claws, are aligned and are traversed by a vertical locking element keeping the claws in said closed position, whereas in the closed position of the mobile claws, the free second end parts of the claws brace the adjacent side sections of each of the channel irons thus forming a guidance passage for the vertical movement of the mast. The mentioned common vertical rotation shaft and the vertical locking element for the mobile claws can be, respectively, a first arm and a second arm of a double bolt. On the other hand, the second ends of the mobile claws can be provided with respective vertical notches in which one of said adjacent side sections of the channel irons is housed, respectively, in said closed position.

The side plates of the guiding head can furthermore comprise respective front projecting parts emerging in the direction towards the mast and between which the horizontal rotation shaft of the bearing rocker is arranged. Thus, in the working position of the bearing rocker, the front part of the bearing rocker at least partially projects horizontally from the front projecting parts between said mobile claws. Thus, each of the support elements can comprise a horizontal projection configured, in said working position, to rest on the front part of the bearing rocker and to thrust said front part upwardly in said hoisting process for hoisting the mast. The rear part of the bearing rocker can be urged by a tension spring anchored to an inclined central rib between the two side plates. This spring makes the rocker recover the working position again once one of the support elements has passed by the mentioned rocker in the hoisting process.

The anchoring frame can be, for example, a horizontal anchoring frame anchored to the surface of the corresponding slab, an angular anchoring frame with one branch anchored to the front surface and the other one borne on the upper surface of a slab, or a vertical anchoring frame anchored in a vertical element, such as a wall, a façade, a column, etc.

For hoisting the module, the system according to the present invention can furthermore comprise a self-climbing device that can be coupled to at least one of said masts and to at least one of said pairs of anchors, during said at least one phase of the hoisting process for hoisting the masts. According to a preferred embodiment, this self-climbing device can comprise a pair of climbing heads and a pair of hoist cylinders with respective upper ends and respective lower ends. According to this embodiment, each climbing head can be articulated to the upper end of a hoist cylinder extensible from a retracted position to an extended position, whereas a second end of each hoist cylinder is articulated to a guiding head of one of the anchors forming a pair of anchors and the climbing head comprises two vertical contact plates, spaced from one another and attached at their lower ends to an attachment plate. A rotation shaft is arranged between the lower parts of the bearing plates in which rotation shaft there pivots a climbing rocker. The climbing rocker can pivot between a hoist position, in which its rear part abuts with a first limiting element, arranged between the bearing plates, whereas its front part supports one of the support elements when the hoist cylinder extends towards said extended position during the hoisting process for hoisting the mast, and a retracted position, in which it allows the passage of at least one of the support elements when the hoist cylinder is retracted to said retracted position. In turn, the attachment plate comprises a first side wing which prolongs frontally into a fixed claw and houses a vertical articulation shaft in which a mobile claw moves, and a second side wing which houses an extractable locking pin which passes through the body of the mobile claw and locks the mobile claw in its closed position in which the claws brace the adjacent side sections of each of the channel irons of the mast.

The hoist cylinders coupled to the climbing heads can be hydraulic cylinders which are powered and controlled by means of a hydraulic generation system such as, for example, a generation system which is able to power 4 cylinders simultaneously, and which can be transported together with the climbing heads and the cylinders. They can be easily disassembled from their site to be subsequently positioned in the next assembly to be hoisted.

According to this embodiment of the self-climbing device, each contact plate can comprise a front edge facing the mast, with a first convex upper section and a second inclined section extending backwards between the first section and the attachment plate, whereas on the side opposite the first section, the bearing plates have respective protuberances with respective coupling openings for a coupling bolt to which the upper end of the hoist cylinder is coupled. The second ends of the claws can be provided with respective vertical recesses in which, in said closed position, one of said adjacent side sections of the channel irons is housed, respectively.

A cone positioning system can be incorporated in the floor under construction for suitable positioning of the anchor cone. It is a collapsible system based on MK beams which, being secured to the sails or the masts of the panel, always allow positioning the cone in the same position, preventing possible misalignments (and therefore problems with alignment) during hoisting. The vertical regulation or adjustment of the system is done by means of an "MK bottom connector" piece, and the positioning of the cone by means of a positioning part of the HWS cone and an HWS sail cone connector. Once the concrete has been added to the slab and the concrete has set, the HWS sail cone connector is removed and the system is lowered so that there is no interference with the slab being built during climbing.

As can be observed, the system according to the present invention is simple, can be hoisted easily, can be adapted without major changes to different construction works and is formed by combinable modules making the system very versatile.

BRIEF DESCRIPTION OF THE DRAWINGS

Aspects and embodiments of the invention are described below based on schematic drawings in which.

Figure 1:
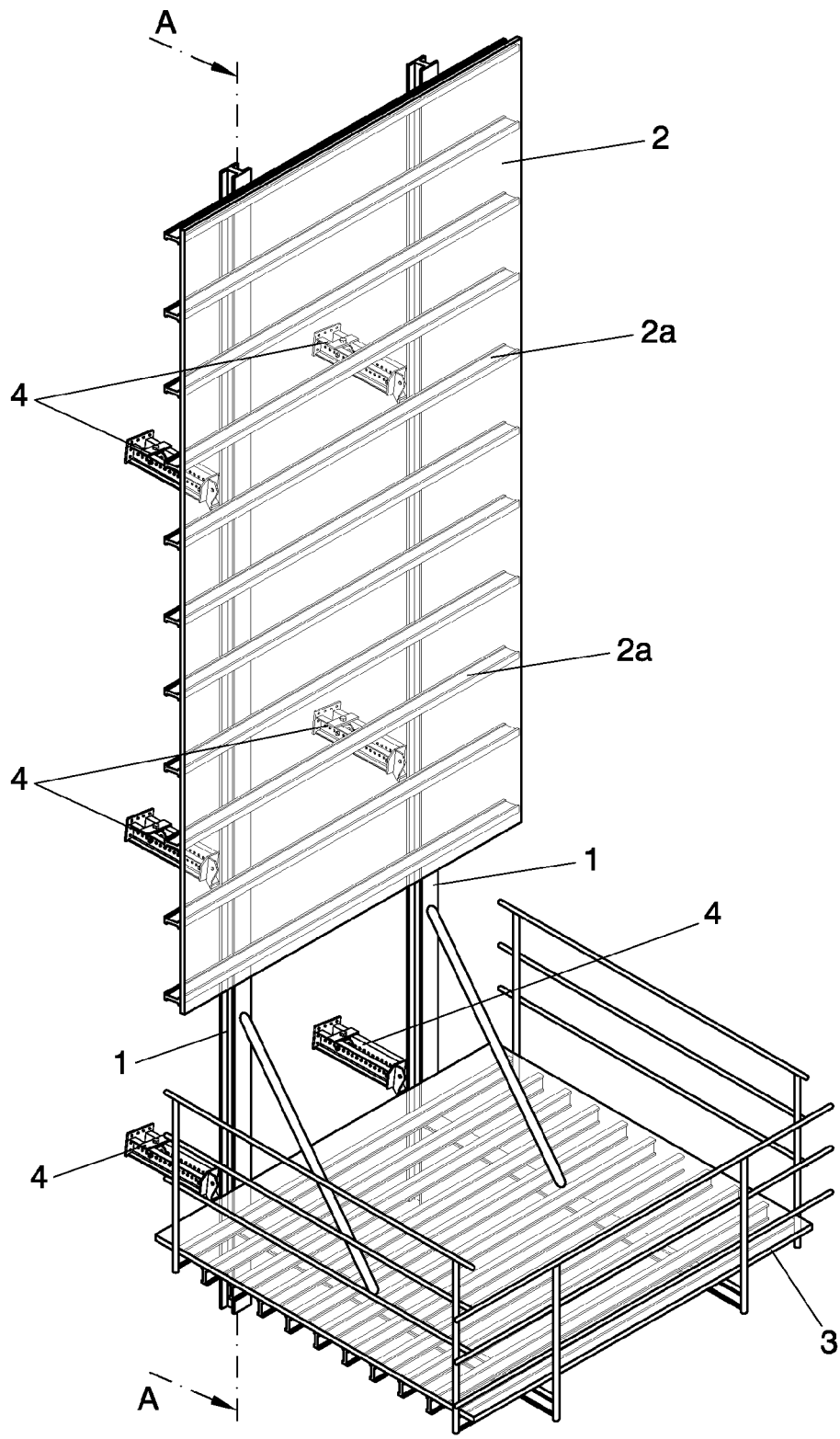
FIG. 1 is a top perspective view of an embodiment of a module according to the present invention.

Reference numbers identifying the following elements are seen in these drawings:

1 masts
1a vertical channel irons
1b central sections
1c side sections
2 protection panel
2a horizontal wooden beams
3 working or unloading platform
4 anchors
5 slabs of a building
6 support block
6a support block projection
7 self-climbing blocks
7a projection of the self-climbing block
8 articulation
8a upper body
8b lower body
8c bolt
9 wall
10 guiding head
10a vertical side plates
10b front projecting parts
10c rear projecting parts
10d rear central recess
10e upper horizontal plate
10f lower horizontal plate
10g inner vertical plate
10h inclined central rib
10i through-hole
10j bearing rib
10k lower sections
11 anchoring frame
11a side channel irons
11b 5 distal end plate
11c proximal end plate
11d lugs
11e locking stop
11f connection openings
11g assembly openings
11h first movable prop
11i second movable prop
11j vertical base
11k horizontal base
11l side partition walls
11m gap
11n upper edges
12 horizontal rotation shaft
13, 13' rotating bearing rocker
13a front part of the bearing rocker
13b intermediate part
13c rear part
14 tension spring
15 stop bolt
16 claws
16a vertical notches
16b central parts
16c handles
16d first guiding flat bar
16e second guiding flat bar
16f first end parts
16g second end parts
16h vertical through-holes
17 double bolt
17a first cylindrical arm of the double bolt
17b second cylindrical arm of the double bolt
17c Seeger ring
18 connecting bolt
19 first horizontal locking bolt
20 second horizontal locking bolt
21 anchor cone
22 clamping screw
23 transverse flat bar
24 climbing head 24a vertical contact plates
24b attachment plate
24c first convex upper section
24d protuberances
24e coupling openings
24f attachment bar
24g stop plate
24h first side wing
24i second side wing
24j fixed claw
24k first guiding element
25 hydraulic cylinder
26 coupling bolt
27 climbing rocker
27a front part of the climbing rocker
27b rear part of the climbing rocker
28 rotation shaft
29 vertical articulation shaft
30 mobile claw
30a second guiding element
31 locking pin
32 grips
33 shock absorber
34 connecting bolt

EMBODIMENTS OF THE INVENTION

Figure 2:
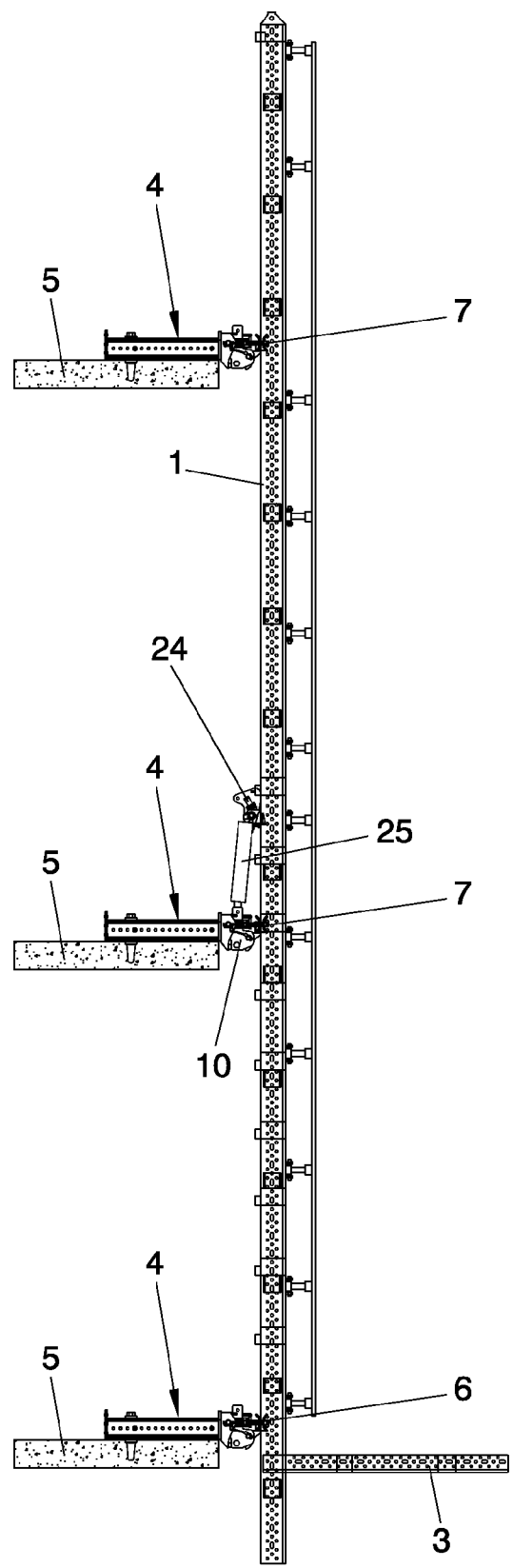
FIG. 2 is a section view along line A-A seen in FIG. 1 but with a protection panel different from the one shown in FIG. 1.
Figure 3:
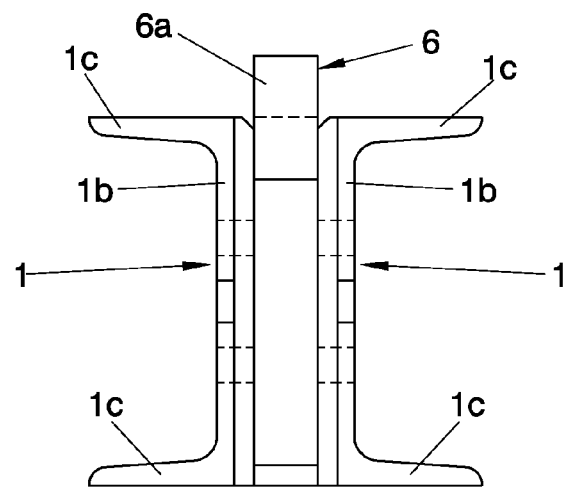
FIG. 3 is a cross-section view of an embodiment of the mast forming part of the present invention.

FIGS. 1-3 show a first embodiment of a module of the system according to the present invention comprising two vertical masts -1- in which there are assembled a protection panel -2- and a working or unloading platform -3- for unloading materials. The masts -1- are fixed to the slabs -5- of a building and guided by means of respective anchors -4-.

The masts -1- can be, for example, standard beams of determined lengths with a continuous configuration of standard simple attachments and openings which allows enormous versatility when forming different types of structures: structures adapted to the desired floor height in each case, different sections adapted to the needs of each work, etc. Depending on the configuration of the protection panel -2- conceived for each case, the latter can also be attached directly to the masts -1-. For example, if the panel -2- is made with boards, the panel -2- can be supported by standard horizontal wooden beams -2a- standard attached directly to the masts -1- with standard connectors.

Each of the masts -1- comprises two vertical channel irons -1a- with U-shaped cross section the central sections -1b- of which face one another and the side sections -1c- of which emerge outwardly. Support elements -6,7- vertically spaced out from one another are immobilized between these central sections -1b-. Conventional spacers (not shown in the drawings) can furthermore be arranged between the channel irons. The channel irons -1a- can be, for example, UPN-180 channel irons with a separation of 52 mm between them, provided with openings with an MK-type configuration which allows incorporating standard MK-type braces where appropriate for forming structures suitable for each case.

The system can have two different support elements, i.e., support blocks -6- and self-climbing blocks -7-, depending on the required tonnage demands of the hoisting. The support block -6- is similar to the self-climbing blocks -7- but more resistant, since it is designed for more unfavorable working conditions—it is from where the entire assembly is supported in working and out of service conditions, whereas the self-climbing blocks -7- are involved only in the self-climbing of the module, which will be explained below in this specification. Both the support block -6- and the self-climbing blocks -7- have respective projections -6a, 7a- projecting from the masts -1- in the direction towards the anchors -4-. In practice, the blocks -6,7- can be unified such that they are all support blocks, i.e., all of them capable of supporting the system in working conditions.

Figure 4:
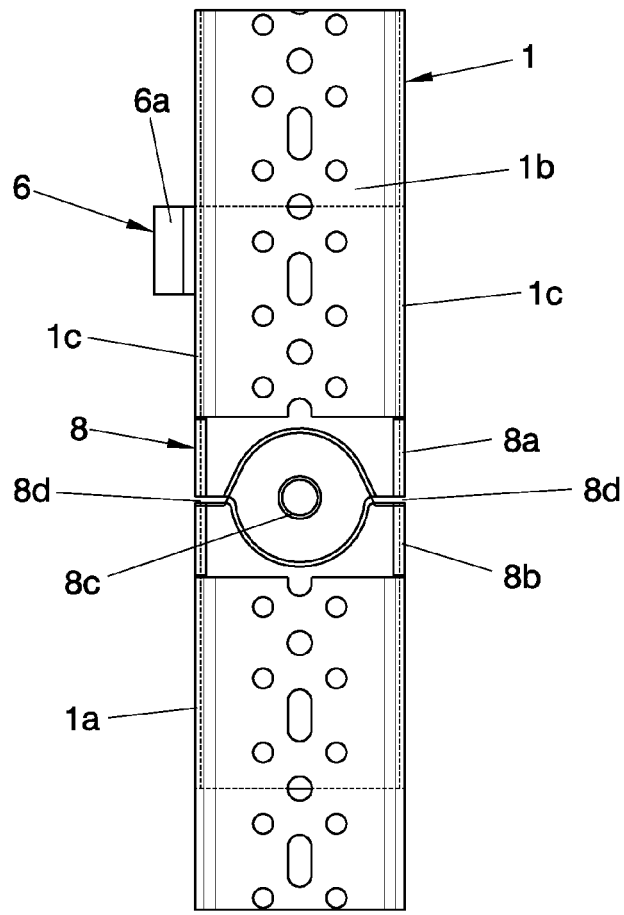
FIG. 4 is a partial side elevational view of another embodiment of the articulated mast forming part of the present invention.
Figure 5:
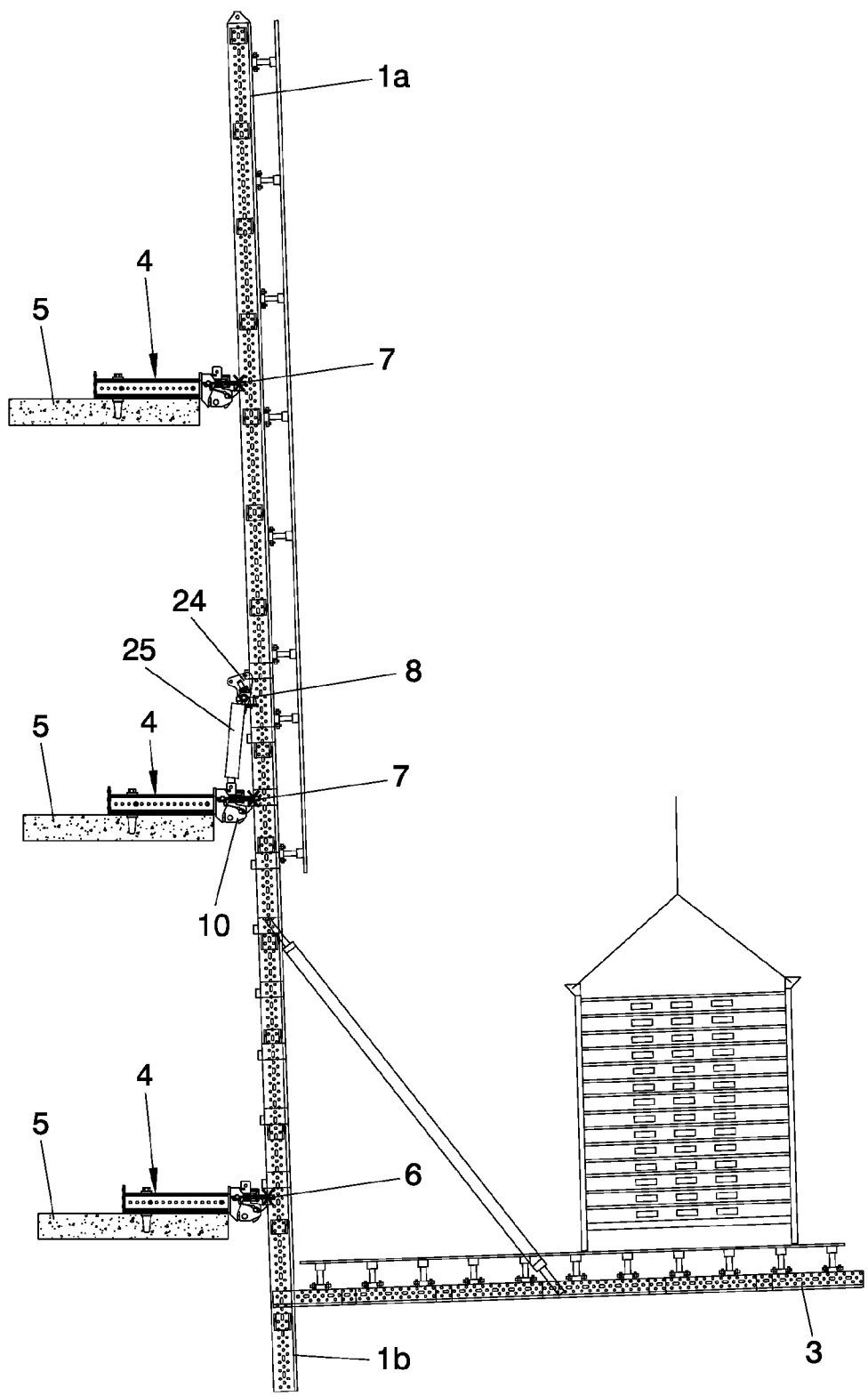
FIG. 5 is a vertical section view of another embodiment of the module according to the present invention comprising articulated masts.

While the masts -1- shown in FIGS. 1-3 are rigid, in the embodiment shown in FIGS. 4 and 5 they are articulated by means of an articulation -8-. This embodiment is useful when in the perimeter to be protected there is a variation of the slabs -5- such that the panel -2- has to zigzag during the hoisting in order to be adapted. Saving exceptional cases, the anchors -4- are placed in the same position from the end of the slabs -5-, so if this end varies, the masts -1- and therefore the entire assembly, has to be adapted.

The articulation -8- is the attachment part for attaching two vertical parts of each mast -1- used to make articulated assemblies and allows limited articulation, such as for example 4° maximum rotation towards and in opposite direction of the building, between these two parts of the mast -1-. The articulation -8- comprises an upper body -8a- attached to the upper part of the mast -1- and a lower body -8b- attached to the lower part of the mast -1-, which are connected to one another by means of a bolt -8c- traversing respective openings in said bodies -1a, 1b-. The upper body -8a- and lower body -8b- of the articulation -8- are shaped such that between them there are respective wedge-shaped side spaces -8d- which, between one another, determine the angle of maximum rotation of the articulation -8-. This limited articulation allows that during the first part of the hoisting process for hoisting the masts -1- until it reaches the height of the waiting anchor, the upper part of each mast -1- and the panel -2- that is supported in the mast -1- swing to a limited angle and do not turn over. Once the level of the new anchor position in wait state is reached, the mast -1- is straightened, guiding it in the anchors -4- and with the hoisting continues to the next working position, in which the articulation is locked in a conventional manner by means of tensioning devices E—not shown in the drawings—placed between the lower and upper parts of the structure.

Figure 8:
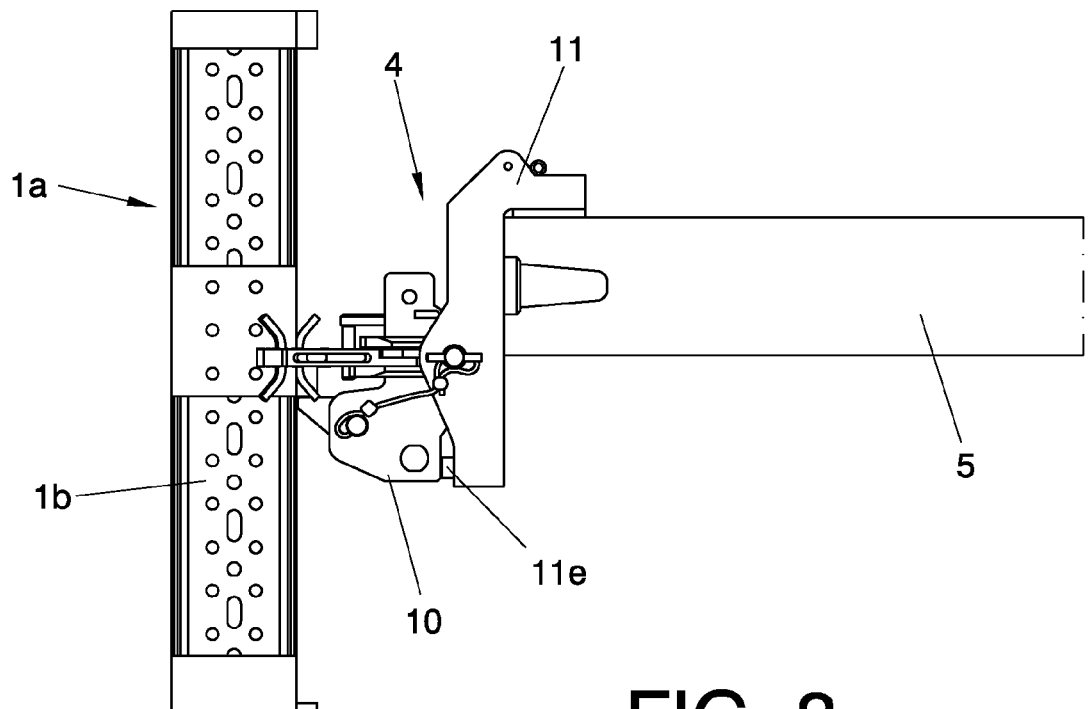
FIG. 8 is a side elevational view of a second embodiment of an anchor according to the present invention.
Figure 9:
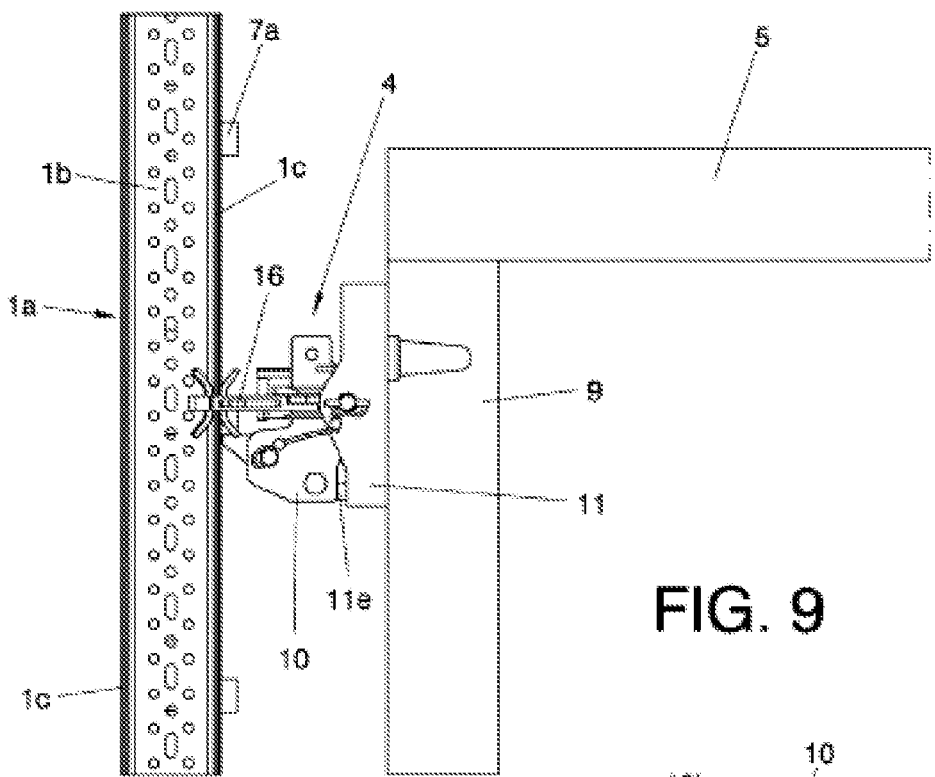
FIG. 9 is a side elevational view of a third embodiment of an anchor according to the present invention.
Figure 10:
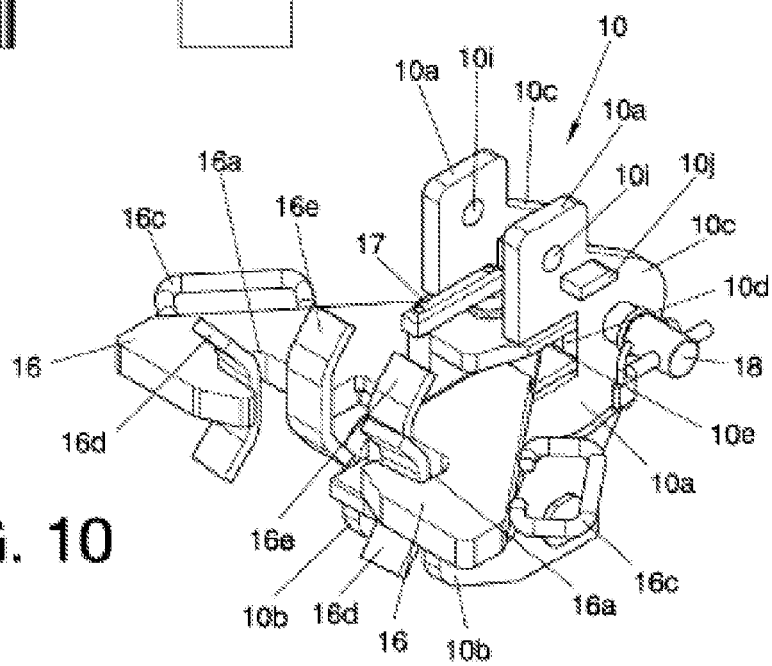
FIG. 10 is a top front perspective view of an embodiment of a guiding head according to the present invention.
Figure 11:
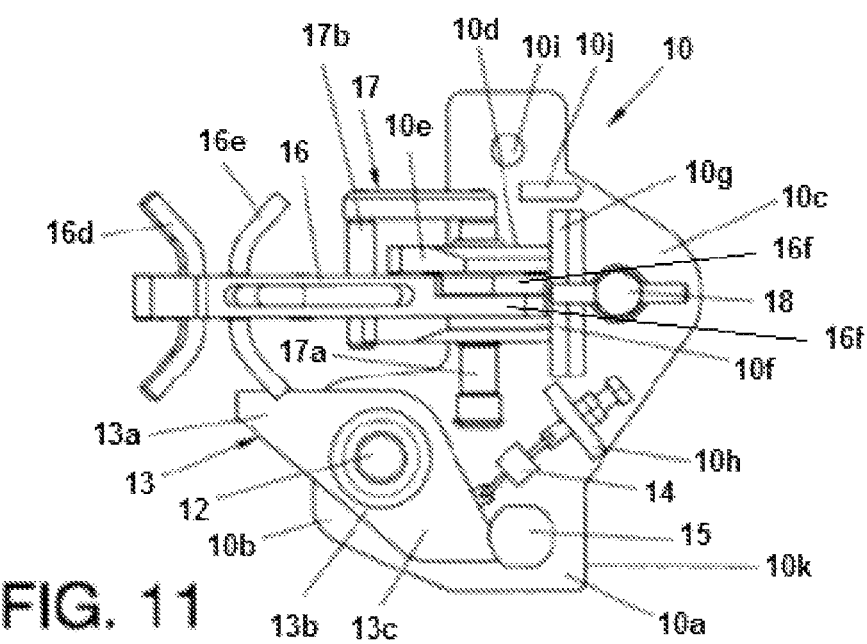
FIG. 11 is a side elevational view of the guiding head shown in FIG. 10.
Figure 18A:
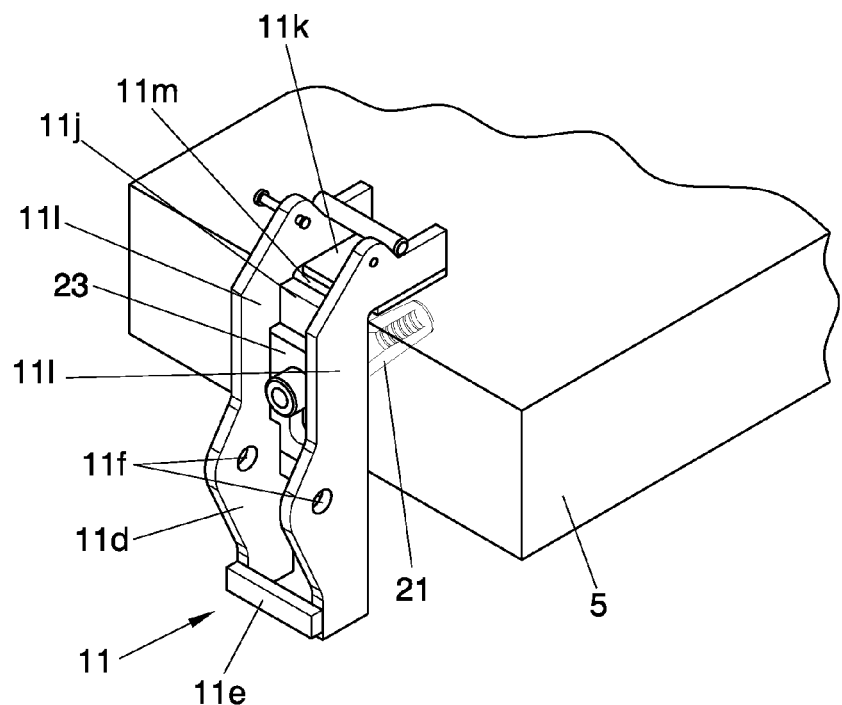
FIGS. 18A and 18B illustrate a second embodiment of an anchoring frame according to the present invention.
Figure 18B:
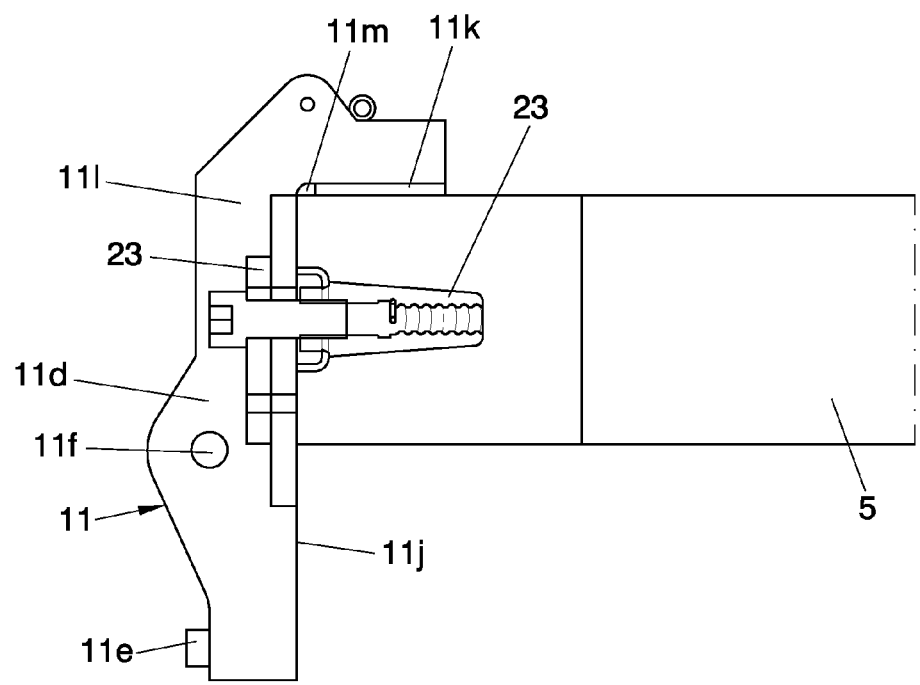
Figure 19A:
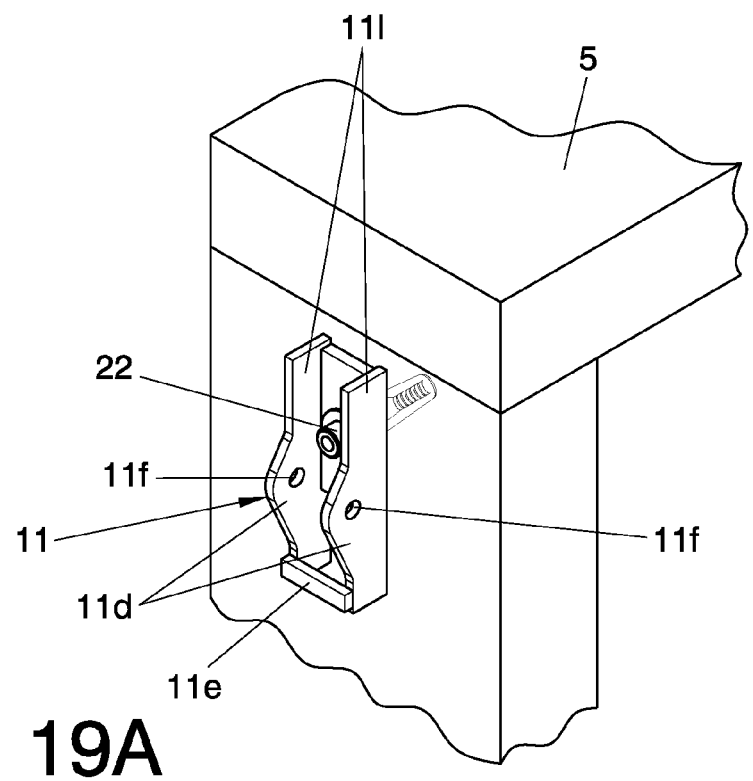
FIGS. 19A and 19B illustrate a third embodiment of an anchoring frame according to the present invention.
Figure 19B:
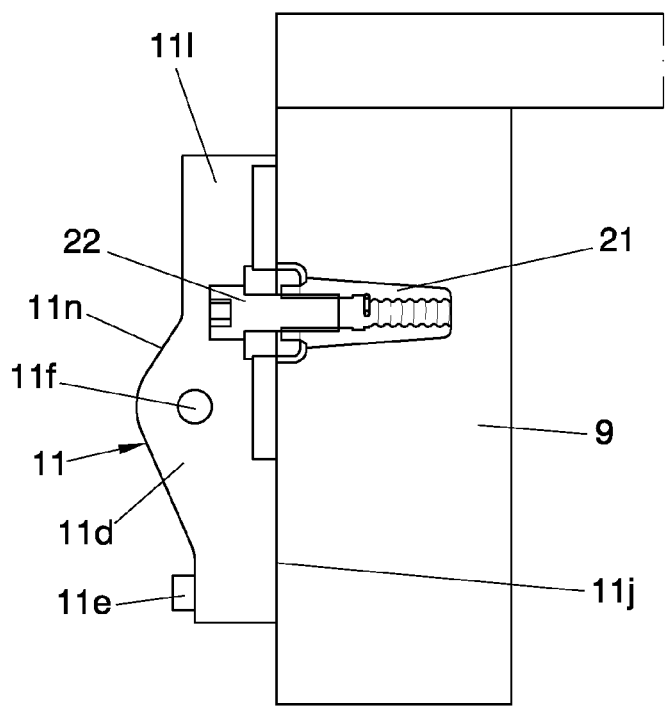
Figure 20:
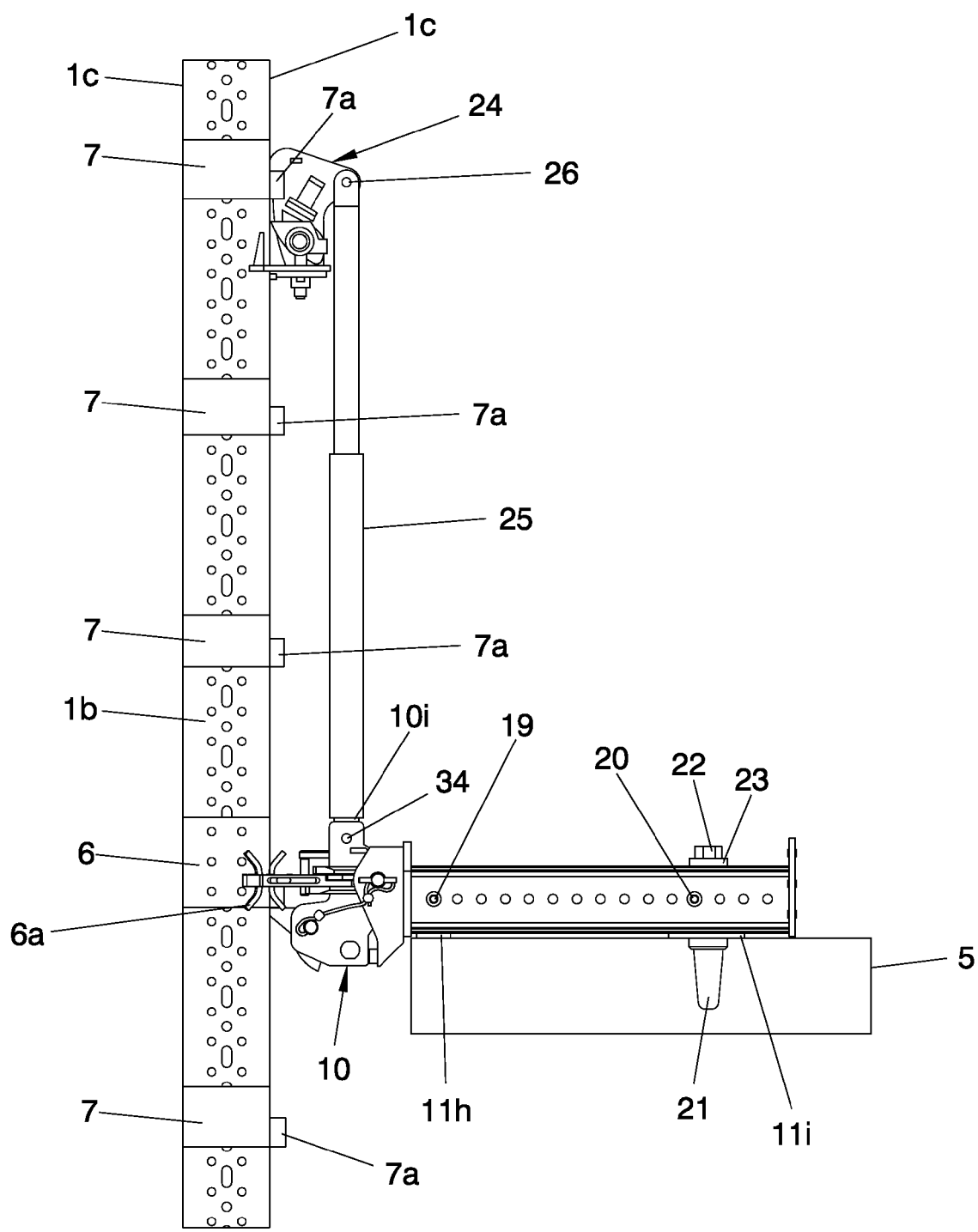
FIG. 20 is a side elevational view showing an embodiment of the hoisting system according to the present invention.
Figure 21:
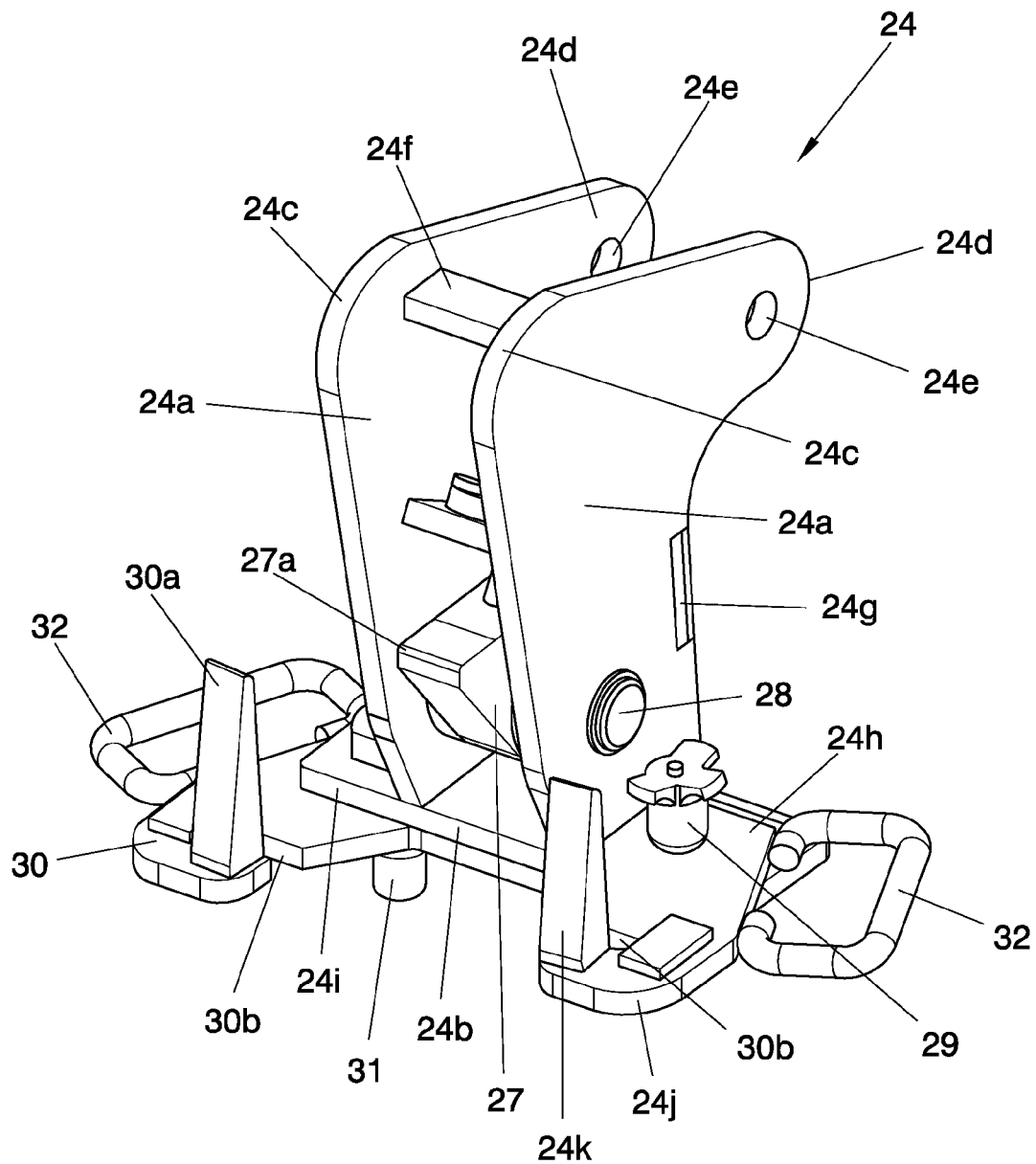
FIG. 21 is a front perspective view of an embodiment of the climbing head forming part of the hoisting system shown in FIG. 20.
Figure 22:
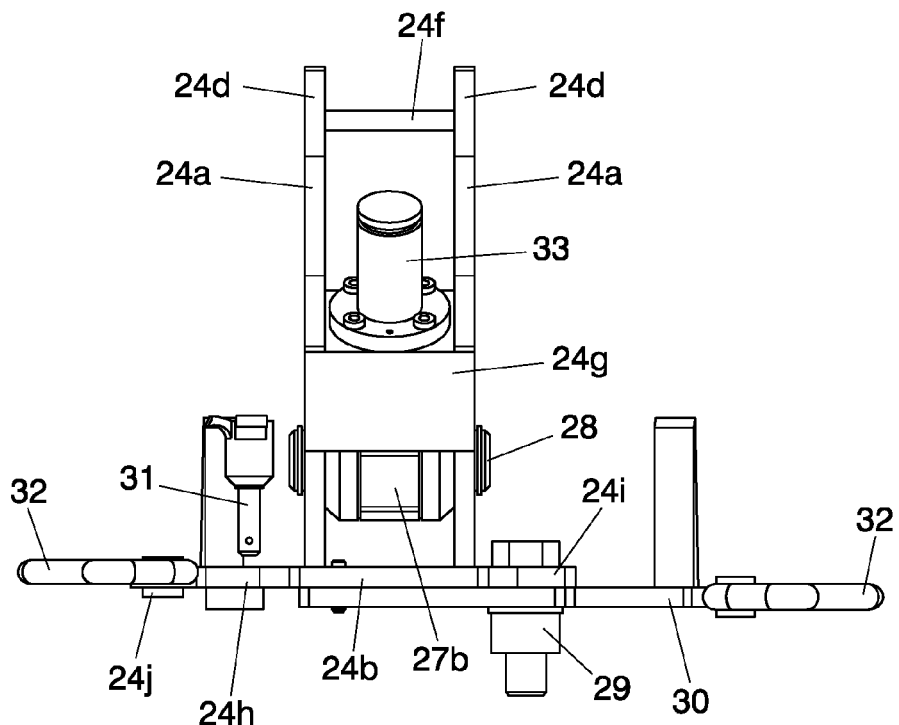
FIG. 22 is a rear elevational view of the climbing head illustrated in FIG. 21 with its mobile claw open.
Figure 23:
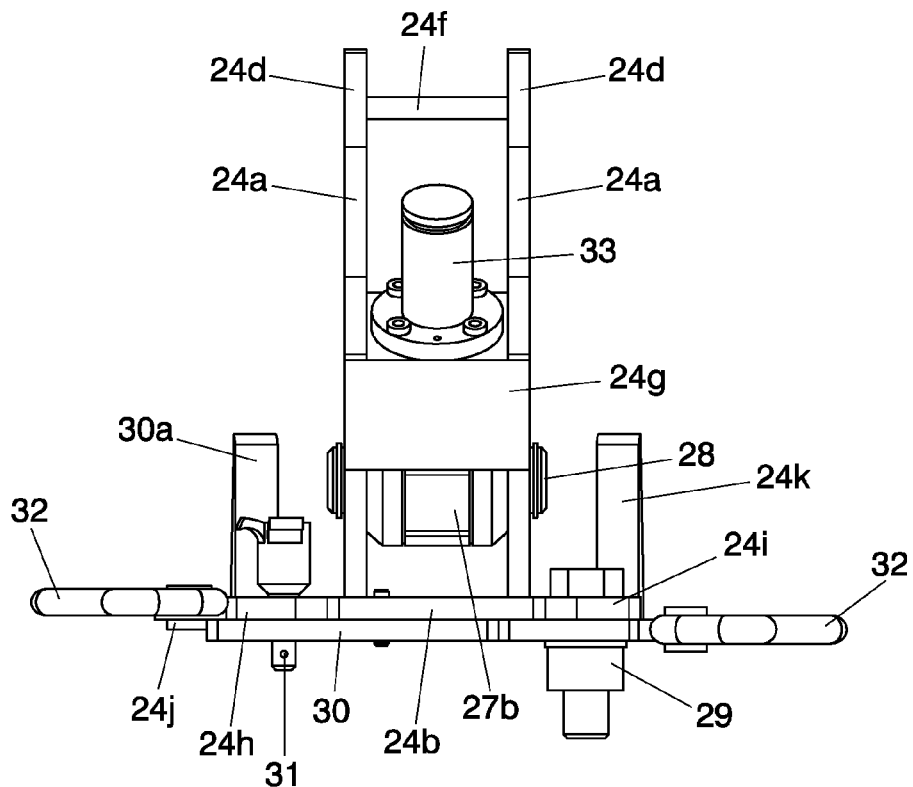
FIG. 23 is a rear elevational view of the climbing head illustrated in FIG. 21 with its mobile claw closed.

The anchors -4- guide and support each of the masts -1-. In order to adapt to the different geometries and to builders' preferences, the anchors -4- shown in FIGS. 7-20 can be anchored in different parts of the building, such as for example on the slab, at the free end of the slab -5-, or in a wall -9-, in a facade, in a vertical column or in a perimetric beam of a building. Thus, the embodiments of the anchors -4- illustrated in FIGS. 7 to 20 are susceptible to such adaptation. FIGS. 7, 12-14, 17 A, 17B and 20 show an anchor -4- anchored in the surface of a slab -5-, FIGS. 8, 18A and 18B show an anchor -4- anchored in the front part of a slab -5-, whereas FIGS. 9, 19A and 19B show an anchor -4- anchored in a wall -9- of the building. In all these embodiments, the anchor -4- comprises the same guiding head -10-, coupled to an anchoring frame -11- adapted to the part of the building in which the anchor -4- is installed.

According to FIGS. 7 to 20, the head -10- of the anchor -4- comprises two vertical side plates -10a-, spaced from one another and having respective front projecting parts -10b- and respective rear projecting parts -10c- as well as a rear central recess -10d-. The side plates -10a- are attached to one another by an upper horizontal plate -10e-, a lower horizontal plate -10f- and an inner vertical plate -10g-. The rear projecting parts -10c- of the side plates -10a- have first openings for the passage of a horizontal connecting bolt -18- which, as will be explained below, serves for coupling the guiding head -10- to the anchoring frame -11-. In turn, the front projecting parts -10b- are traversed by the horizontal rotation shaft -12- of a rotating bearing rocker -13- urged by an adjustable tension spring -14- which is anchored to an inclined central rib -10h- between the two side plates -10a. A through-hole -10i- and a bearing rib -10j- which laterally emerges outwardly, the functions of which will be described below in this specification, are located in the upper part of each of the side plates -10a.

Figure 12:
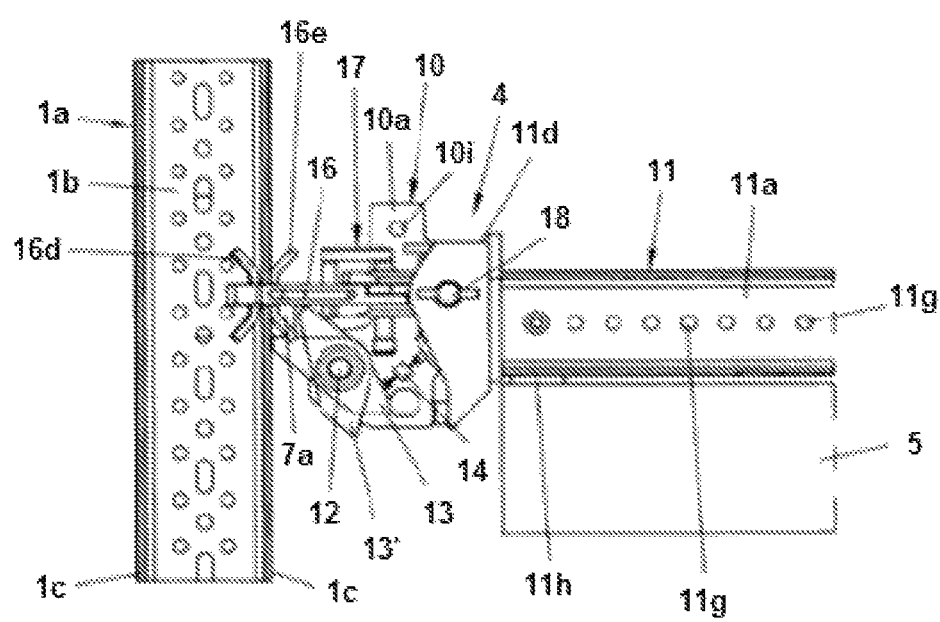
FIG. 12 is an enlarged side elevational view of the anchor shown in FIG. 7.
Figure 13:
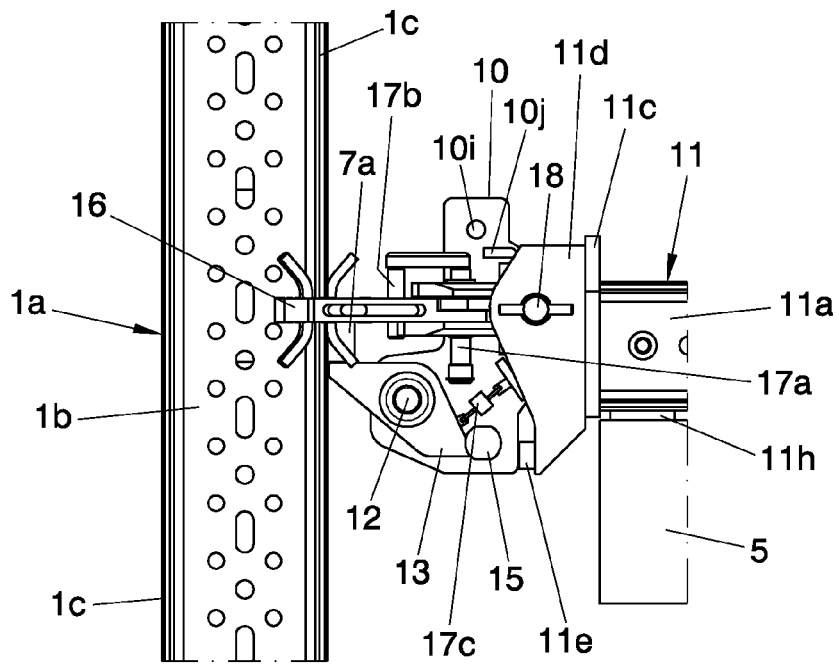
FIG. 13 is a partial side elevational view of the anchor shown in FIG. 12.
Figure 14:
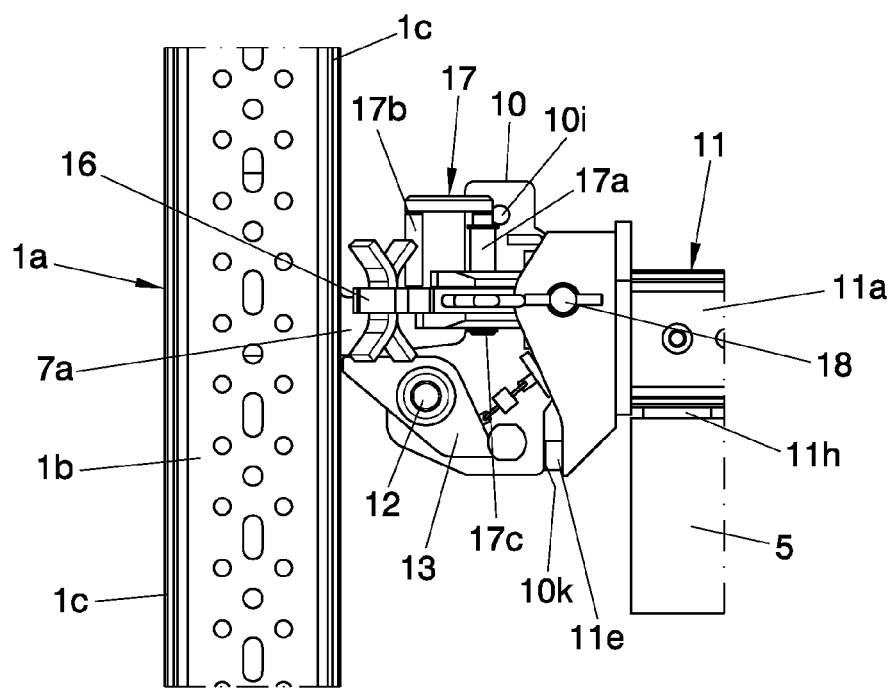
FIG. 14 is a partial side elevational view in which the anchor shown in FIG. 13 is illustrated with its claws open.
Figure 15A:
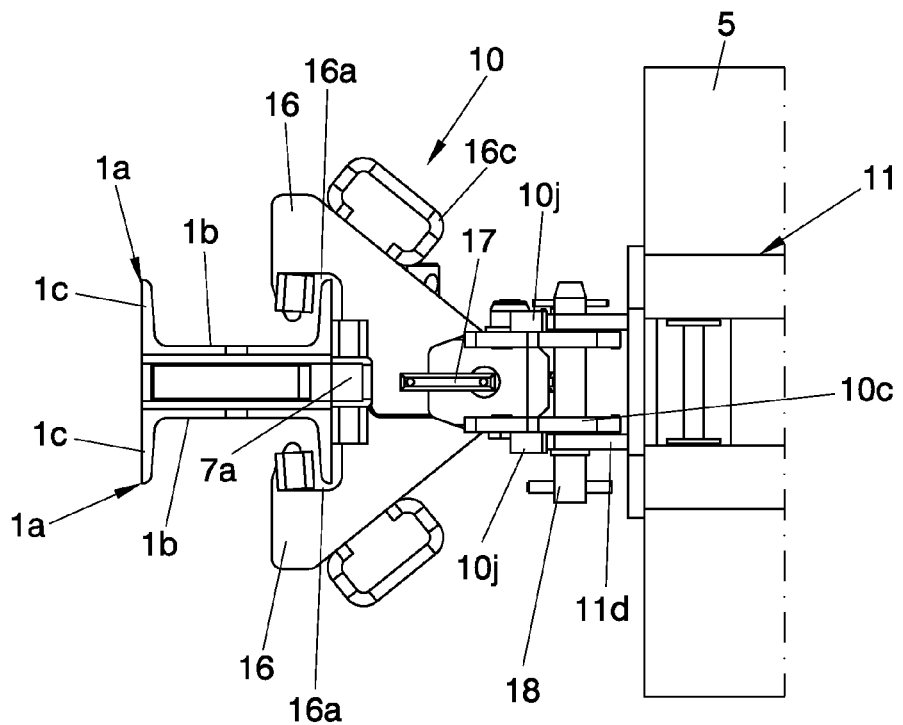
FIG. 15A is a partial top plan view of the closed anchor shown in FIG. 13.
Figure 15B:
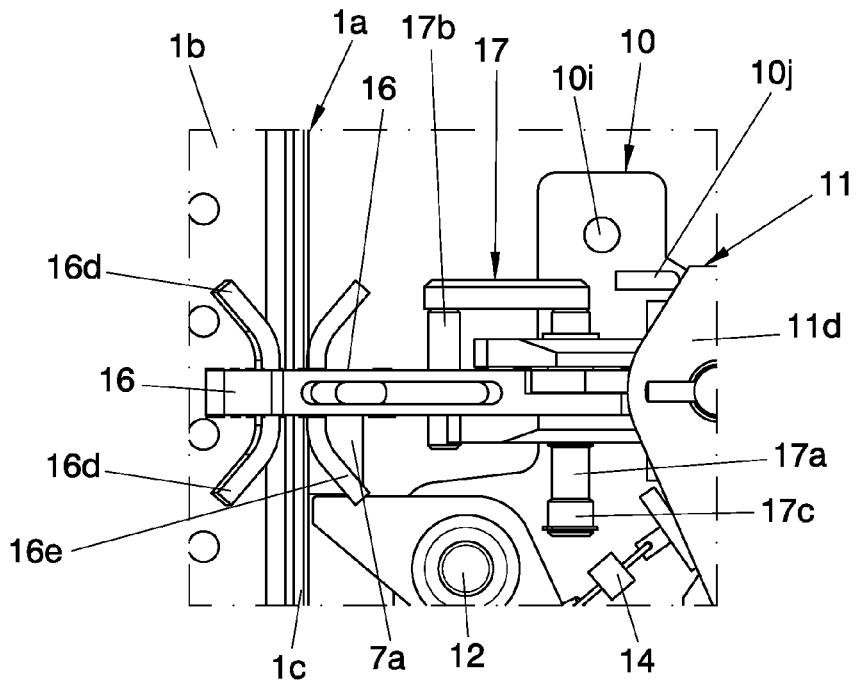
FIG. 15B is a partial side elevational view showing the anchor shown in FIG. 13 in more detail.
Figure 16A:
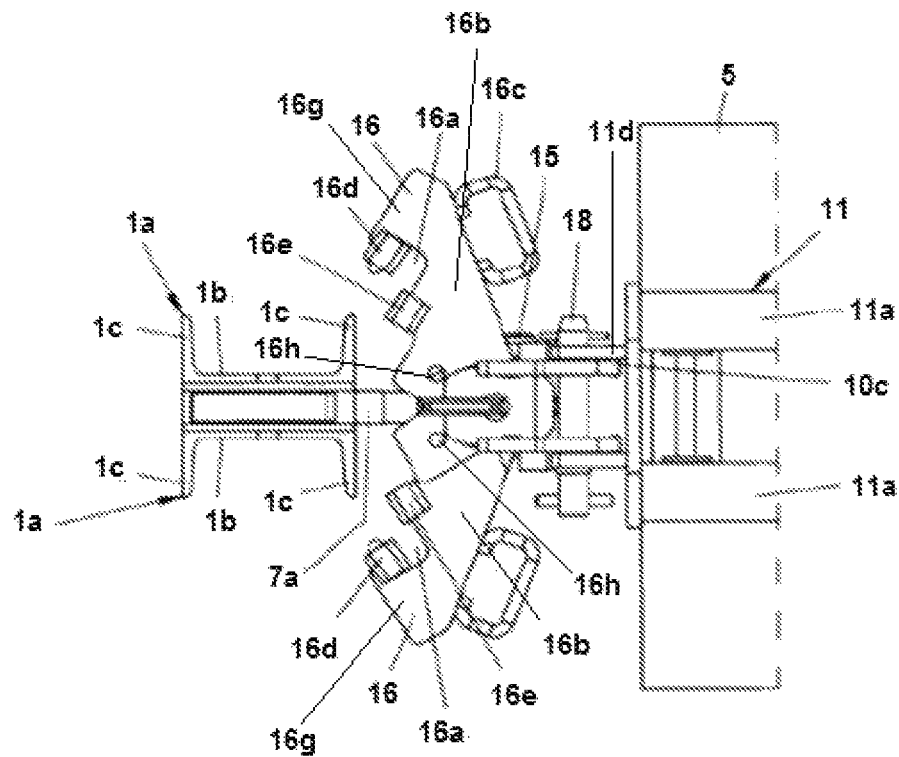
FIG. 16A is a partial top plan view of the closed anchor shown in FIG. 14.
Figure 16B:
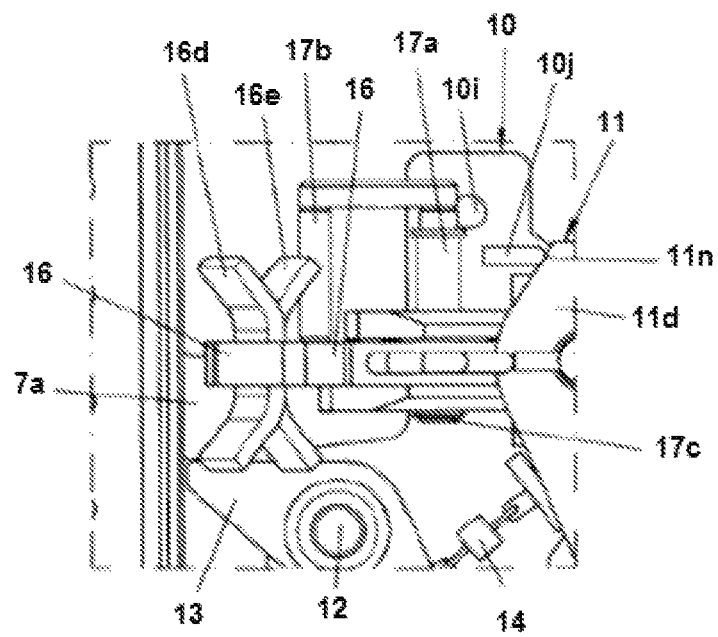
FIG. 16B is a partial side elevational view showing the anchor shown in FIG. 14 in more detail.

The bearing rocker -13- is a vertical rotating plate which can rotate about the horizontal rotation shaft -12- between a working position and a release position, shown respectively as 13 and 13' in FIG. 12, and comprises a front part -13a- which, in the mentioned working position, projects from the front projecting parts -10b- and the upper surface of its front part -13a- provide a horizontal bearing surface for, independently of the relative location of the anchor -4- with respect to the mast -1-, the projections of the support block -6- or of one of the self-climbing blocks -7-. The bearing rocker -13- furthermore comprises an intermediate part -13b- traversed by the mentioned shaft -12- and a rear part -13c- in which the tension spring -14- is coupled.

In the working position, the lower surfaces of the front part -13a- and of the intermediate part -13b- of the bearing rocker -13- extend in an inclined manner downwardly forming a sliding ramp, whereas the rear part -13c- abuts with a stop element in the form of a stop bolt -15- such that the upward rotation of the rear part -13c- of the bearing rocker -13- is limited by the stop bolt -15-. On the other hand, when the posts -1- are hoisted and, therefore, the projections -6a, 7a- of the support block -6- and of the self-climbing blocks -7- move upwardly with respect to the anchors, despite the fact that these projections -6a, 7a- pass successively through the anchors -4-, they thrust upwardly against the force exerted by the tension spring -14- the corresponding front parts -13a- of the rockers -13- slide over the sliding ramp such that the bearing rocker -13- rotates towards the release position -13'-. Once the projection -6a, 7a- has passed over the bearing rocker -13- the tension spring -14- forces the bearing rocker -13- to recover the previously described working position. Therefore, when they are in their working position, the rockers -13- prevent a downward free falling of the masts -1- if, for any accidental reason, a malfunction were to occur in the hoisting system (described below in the present specification) and/or in the support block -6-.

The head -10- furthermore comprises two horizontal claws -16- with respective first end parts -16f-articulated to one another at a common vertical rotation shaft formed by a first cylindrical arm -17a- of a double bolt -17- traversing first aligned vertical openings in the horizontal plates -10e, 10f- and in the mentioned first end parts -16f- of the two horizontal claws -16-. The claws -16- furthermore comprise respective central parts -16b- and free second end parts -16g-.

In the closed position of the claws -16-, the free second end parts of the claws -16- brace the adjacent side sections -1c- of each of the channel irons -1a- thus forming a guidance passage for the vertical movement of the mast -1- to which they are assigned. To that end, the respective second end parts of the claws -16- are provided with respective vertical notches -16a- respectively housing one of said adjacent side sections -1c- of the channel irons -1a-. In the central parts -16b-, the claws -16- are provided with respective vertical through-holes -16h- which, in the closed position of the claws -16-, are aligned and traversed by a locking element in the form of a second cylindrical arm -17b- of the double bolt -17- keeping the claws -16- in said closed position.

To make it easier to guide the masts -1- in the guidance passage defined between the claws -16-, each of their second end parts is provided with a first guiding flat bar -16d- with a curved side section arranged in the wall of the vertical notch -16a- located opposite each of the central parts -16b- of the claws -16- and of a second flat bar -16e- with a curved side section next to each of central parts -16b-. In the closed position of the claws -16-, these flat bars -16d, 16e- are coplanar with their facing convex sides, such that one of the respective adjacent side sections -1c- of each vertical channel iron -1a- is arranged between each pair of flat bars -16d, 16e-. This arrangement makes it easier to slide the masts -1- into their anchors -4-.

For the purpose of preventing the double bolt -17- from coming out of its site entirely, the lower end of its first arm -17a- is provided with a Seeger ring -17c- with a larger diameter than the vertical opening in the lower horizontal plate -10f of the head -10-. On the other hand, the first cylindrical arm -17a- is longer than the second cylindrical arm -17b- of the double bolt -17-. It is thus possible to completely extract the second cylindrical arm -17b- while at the same time the first cylindrical arm -17a- continues to maintain its function of vertical rotation shaft at which the first end parts -16f- of the claws -16- are articulated. To open the claws -16-, the double bolt -17- is pulled upwardly until its second cylindrical arm -17b- comes out of the vertical through-holes -16h- in the central parts -16b- of the claws -16-, and the handles -16c-, which, respectively, are located in the outer side walls of the claws -16-, are pulled.

FIGS. 17A-19B show three possible embodiments of the anchoring frame -11-.

Figure 17A:
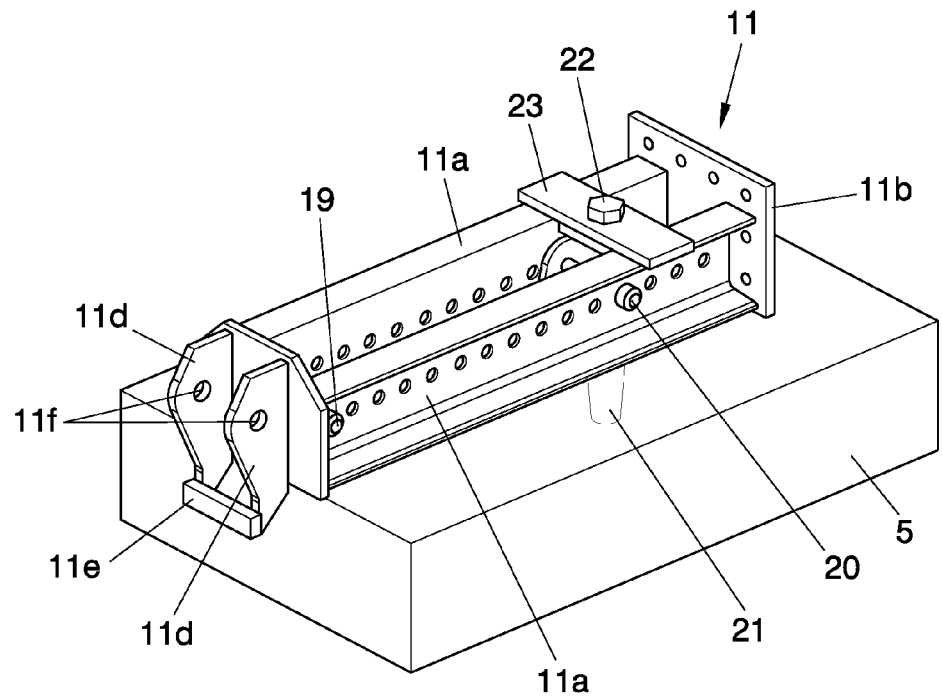
FIGS. 17A and 17B illustrate a first embodiment of an anchoring frame according to the present invention.
Figure 17B:
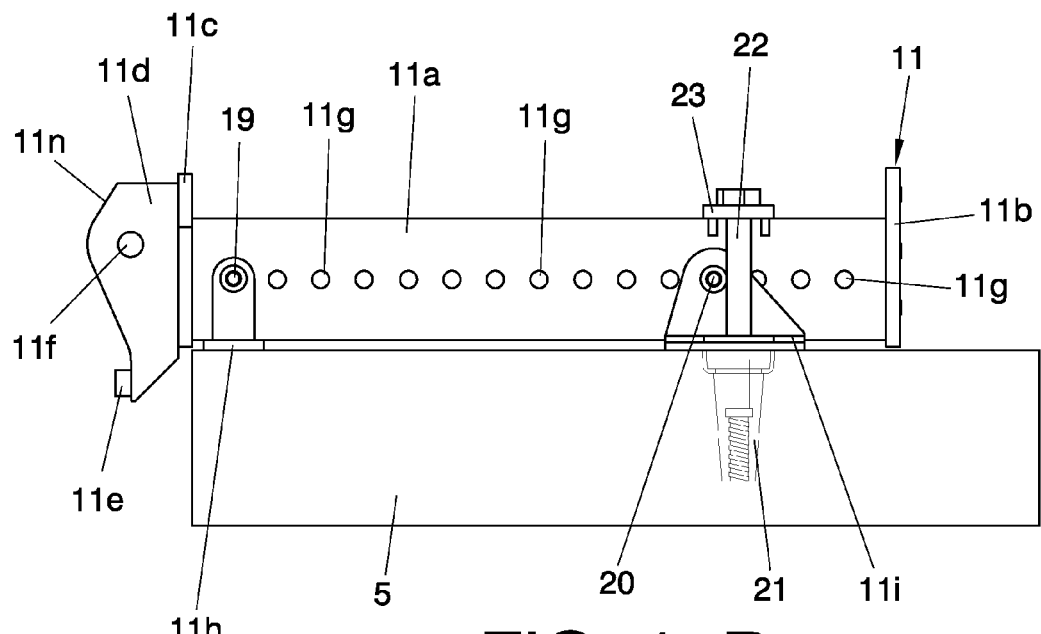

In the first embodiment shown in FIGS. 17A and 17B, the anchoring frame -11- is anchored to the upper surface of a slab -5-. The frame -11- comprises two side channel irons -11a- spaced out from one another and attached at their respective ends by a distal end plate -11b- and by a proximal end plate -11c-. Projecting from the plate proximal -11c-, which is flush with the front edge of the slab -5-, there are respective curved vertical lugs -11d- comprising respective connection openings -11f- and which at the lower part are retracted in inclined sections towards the slab -5-. The lower parts of the inclined sections are attached to one another by a horizontal locking stop -11e-. In the assembled state of the anchor -4-, the lugs -11d- contact the end surfaces of the rear projecting parts -10c- of the side plates -10a- of the head -10- such that the connection openings -11f- are aligned with complementary openings in the respective rear projecting parts -10c-. The connecting bolt -18- can thus be inserted through those openings for coupling the head -10- to the anchoring frame -11-. In this assembly position, the upper edges of the lugs -11d- abut with the respective bearing ribs -10J- in the side plates -10a- of the head -10- whereas the locking stop -11e- abuts with respective lower sections -10k- of the rear edges of the side plates -10a- such that the head -10- is immobilized.

The side channel irons -11a- comprise assembly openings -11g- arranged in an axial row between the end plates -11b, 11c- and can be, for example, UPN-140 channel irons with D20 openings every 50 mm.

The side channel irons -11a- are supported by a first prop -11h- arranged in the proximity of the proximal end plate -11c- and of a second prop -11i- in the proximity of the distal end plate -11b-.

The first prop -11h- comprises a horizontal base plate on which the side channel irons -10a- rest. Vertically emerging from the base plate there are two side wings placed against the respective inner surfaces of the two side channel irons -11a- and provided with through-holes that can be aligned with the assembly openings -11g- in the side channel irons -11a- such that a first horizontal locking bolt -19- can be inserted through these openings.

The second movable prop -11i- comprises a base flat bar on which the side channel irons -11a- also rest and which has a central through-hole. Vertically emerging from the flat bar are two fixing wings which are also placed against the respective inner surfaces of the side channel irons -11a- and which also have through-holes that can be aligned with the mentioned assembly openings, such that a second horizontal locking bolt -20- can be inserted through these openings. The central opening of the base flat bar is aligned with an anchor cone -21- embedded in the slab -5-, in which a clamping screw -22- is screwed. The head of the clamping screw -22- projects from a transverse flat bar -23- arranged on the upper edges of the two side channel irons -11a-. Upon tightening the clamping screw -22- in the anchor cone -21-, the anchoring frame -11- is firmly immobilized on the slab -5-.

In the second embodiment of the anchoring frame -11- shown in FIGS. 18A and 18B, such frame comprises a vertical base -11j- placed against the front end of the slab -5- and a horizontal base -11k- resting on the upper surface of the slab -5-, attached by two side partition walls -11l- emerging from these bases -11j, 11k- and which, therefore, comprise respective vertical sections and respective horizontal sections. Between the bases there is a gap -11m- which, in the assembly position of the anchoring frame -11-, coincides with the upper edge of the slab -5-. The anchoring frame -11- can thus absorb irregularities in the area of the upper edge of the slab -5- and therefore correct seating of the frame -11- is assured. The vertical base -11j- comprises a central opening for the passage of a clamping screw -22- which screws in an anchor cone -21- such that the vertical base is firmly anchored in the front part of the slab Projecting from the vertical sections of the side partition walls -11l- are respective curved vertical lugs -11d- which, like the previously described lugs in reference to FIGS. 17A and 17B, comprise respective connection openings -11f-, whereas lower parts of the vertical sections of the partition walls -11l- are attached to one another by horizontal a locking stop -11e-. The coupling of the anchoring frame -11- to the head -10- is therefore similar to the previously described coupling in reference to FIGS. 17A and 17B.

FIGS. 19A and 19B illustrate a third embodiment of the anchoring frame -11- anchored in a wall -9- of a building. As can be observed, this third embodiment differs from the second embodiment shown in FIGS. 18A and 18B only in that it does not comprise a horizontal base and therefore no horizontal section of the side partition walls -11l-. Therefore, according to this third embodiment the anchoring of the frame -11- to the wall -9- and its coupling to the head -3- are similar to that described in reference to the mentioned second embodiment.

FIGS. 20-23 illustrate an embodiment of a self-climbing device according to the present invention, used for hoisting masts 1. Although these figures show a single self-climbing device, it is understood that in the embodiment shown in the figures, there are respective self-climbing devices for the two masts -1-.

As can be observed, the self-climbing device comprises a climbing head -24- connected to the guiding head -10- of the anchor -4- immediately thereunder by means of a hydraulic hoist cylinder -25- the lower end of which is connected to the head -10- by means of a connecting bolt -34- traversing the through-holes in the upper parts of the side plates -10a, 10b- of the head -10-.

The climbing head -24- comprises two vertical contact plates -24a- spaced from one another and attached at their lower ends to an attachment plate -24b-. The front edge of each of the contact plates -24a- facing the mast -1- comprises a first convex upper section -24c- and a second inclined section extending backwards between the first section -24c- and the attachment plate -24b-. In the side opposite the first section -24c-, the vertical contact plates -24a- have respective protuberances -24d- with respective coupling openings -24e- for the passage of a coupling bolt -26- to which the upper end of the hydraulic cylinder -25- is coupled. The upper front areas of the vertical contact plates -24a- are attached by means of an attachment bar -24f-.

Between the lower parts of the vertical contact plates -24a- there is arranged a rotation shaft -28- about which a climbing rocker -27- rotates. The climbing rocker -27- has a structure similar to the bearing rocker -13- of the guiding head -10-, and of its front part upward rotation is limited by a shock absorber -33- anchored between the vertical contact plates -24a- and contacting the front part -27a- of the climbing rocker -27- whereas its downward rotation is limited when its rear part -27b- abuts with the lower edge of a stop plate -24g- arranged in a central area between the rear parts of the vertical contact plates -24a-.

The attachment plate -24b- comprises a first side wing -24h- and a second side wing -24i-. The first side wing -24h- prolongs frontally into a fixed claw -24j- and furthermore houses a vertical articulation shaft -29- in which a mobile claw -30- rotates horizontally. In turn, the second side wing -24i- houses an extractable locking pin -31- which passes through the body of the mobile claw -30- and locks the mobile claw -30- in its closed position in which the claws -24j, 30-, brace, similarly to how the claws -16- of the guiding head -10- do, the adjacent side sections -1c- of each of the channel irons -1a- of the mast -1-. The pin -31- keeps the two claws -24i, 30- closed in their working position, making the head stay braced against the mast -1-. When the pin -31- is extracted, the mobile claw -30- is free and can move laterally, releasing the head -24- from the mast -1-.

The hydraulic cylinders -25- operating the climbing heads -24- are powered and controlled by means of a hydraulic generation system- not shown in the drawings-, which is capable of powering a plurality of cylinders -25- simultaneously, and can be transported together with the climbing heads -24- and the cylinders -25-. The cylinders -25- are easily disassembled from their site for subsequently positioning them in the next module to be hoisted.

Emerging at the upper part of the free end part of the fixed claw -24j- is a first vertical guiding element -24k-, whereas emerging from the free end part of the mobile claw -30- there is a second guiding element -30a-. On the other hand, to make it easier to handle the head -24-, the claws -24j-, 30- are provided with grips -32-.

When the climbing head -24- is thrust upwardly due to the eccentricity of the thrusting force caused by the position of the coupling bolt -26- in which the hydraulic cylinder -25- is articulated, the upper part of the head -24- is inclined towards the mast -1- such that the curved sections -24c- of the front edges of the vertical contact plates -24a- are borne on the mast -1-. Upon following its upward path, the upper surface of the front part -27a- of the climbing rocker -27- abuts with the projection -7a- of the corresponding self-climbing block -7- drags the block -7- upwardly such that the mast is hoisted. This is possible because the front part of the bearing rocker -13- of the guiding head -10- rotates upwardly and therefore simultaneously allows the passage of the projection -7a- of one or several of the lower self climbing blocks -7-. Once one of the self-climbing blocks -7- located at a desired distance has surpassed the head -10- and the hydraulic cylinder -25- is retracted, the projection -7a- of the self-climbing block -7- rests on the bearing rocker -13- of the guiding head -10-. In turn, the climbing head -24- moves downward on the mast -1- guided by the closure of its claws -24j, 30- and the front part of its climbing rocker -27- rotates downwardly, allowing the passage of the projection or projections -7a- of one or more self-climbing blocks -7-. When the hydraulic cylinder -25- has reached the desired retracted position, it is again extended, thrusting the climbing head -24- upwardly again such that the climbing rocker -27- again abuts with a self-climbing block -7- and drags it upwardly, hoisting the mast -1- to the next position. The masts -1-, and therefore the panel -2- as well as, where appropriate, the platform -3-, are hoisted successively to higher positions until they are arranged at the desired height.

An embodiment of the operation of the perimetric protection system according to the present invention can be seen in FIGS. 6A-6D which show a mast -1-, a protection panel -2- and a working platform -3-. The mast -1- and the panel have a height of three stories.

Figure 6A:
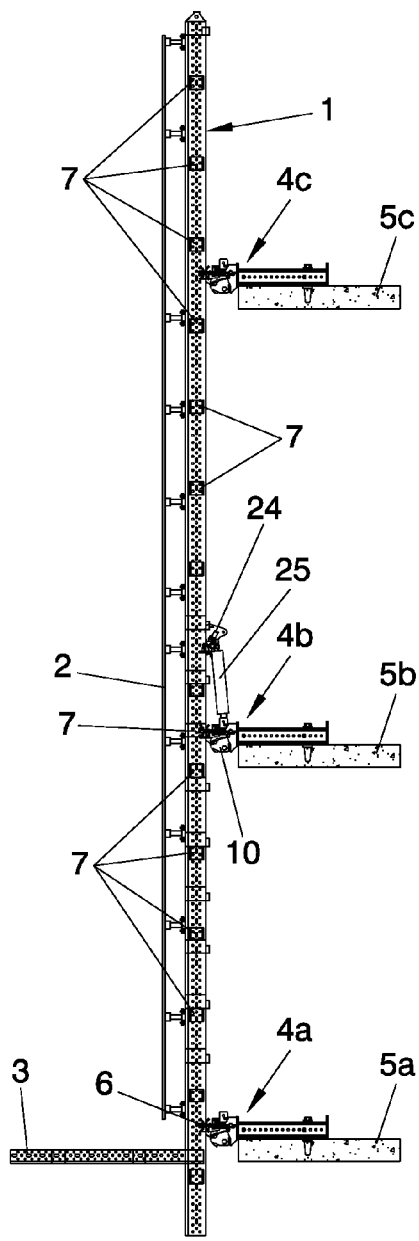
FIG. 6A is a section view of the module shown in FIG. 2 from the opposite side in a first working position.

FIG. 6A shows a mast -1- comprising a lower support block -6- and a plurality of self-climbing blocks -7- spaced from one another at different heights of the mast -1-. The mast -1- is anchored in a first anchor -4a- in a first slab -5a- of a first story, a second anchor -4b- in a second slab -5b- of a second story, and in a third anchor -4c- in a third slab -5c- of a third story. The climbing head -24- is connected by means of the hydraulic cylinder -25- to the second anchor -4b- arranged in the second slab -5b-. The fourth slab -5d- corresponds to a fourth story in which a perimetric protection is to be installed.

Figure 6B:
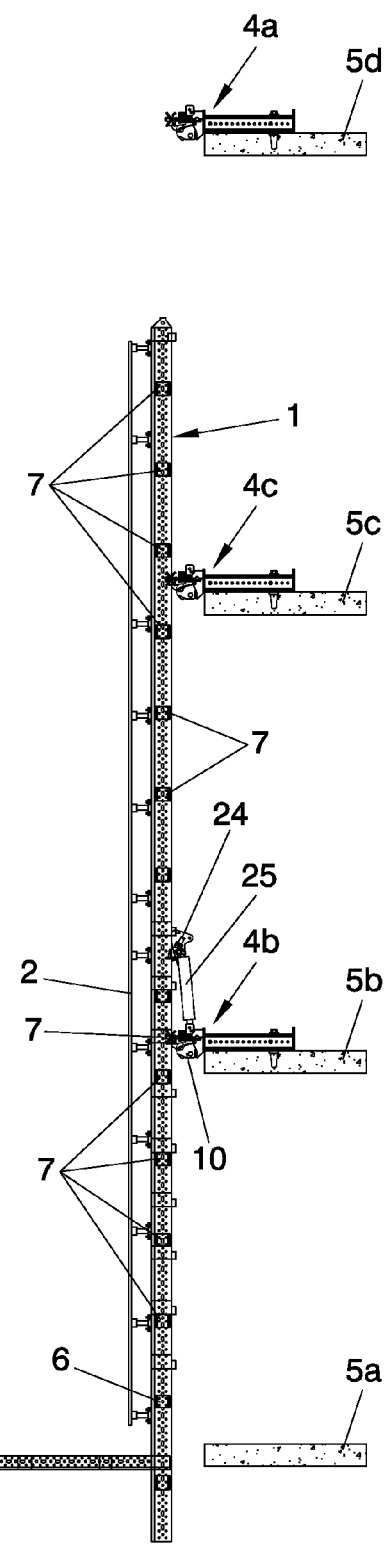
FIG. 6B shows the module illustrated in FIG. 6A at the end of a first phase of the hoisting process.

At the end of a first phase of hoisting shown in FIG. 6B, once the claws of the first anchor -4a- are open, said first anchor -4a- has been disassembled from the first slab -5a- and assembled in the fourth slab -5d- with its claws open. The claws of the climbing head -24- are closed.

A second phase then begins in which the hydraulic cylinder -25- thrusts the climbing head -24- upwardly such that it abuts with the self-climbing block -7- immediately thereabove and thrusts it upwardly, thus hoisting the mast -1- which is still guided in the respective claws of the second anchor -4b- and of the third anchor -4c- the respective rockers -13- of which allow the self-climbing blocks -7- immediately thereabove to surpass them. Then, the hydraulic cylinder -25- is retracted and the climbing head -24- moves downwards, sliding along the mast -1- guided by its claws, whereas as its climbing rocker -27- rotates upwardly, it allows the passage of the self-climbing blocks -7- located thereunder which it encounters during the downward movement until reaching its lower position in which it is located under the next self-climbing block -7-. In turn, a next self-climbing block -7- which has reached the second anchor -4b- rests on the bearing rocker -13- whereas whereas a self-climbing block arranged in the upper part of the mast -1- surpasses the first anchor -4a- which is now installed in the fourth slab -5d-. The claws of this first anchor -4a- in the fourth slab -4d- close and, therefore, guide the upper part of the mast -1-. This position of the system is illustrated in FIG. 6C.

After the third phase, the fourth phase commences in which the climbing head -24-, operated by the hydraulic cylinder -25-, makes upward and downward movements similar to those described above with respect to the second phase, until the support block -6- rests on the bearing rocker -13- of the second anchor -4b- in the second slab -5b-, such that the protection panel -2- is located laterally protecting the second story located between the second and third slabs -5b, 5c-, the third story located between the third slab -5c- and the fourth slab -5d- and the fourth story located above the fourth slab -5d-.

Figure 6C:
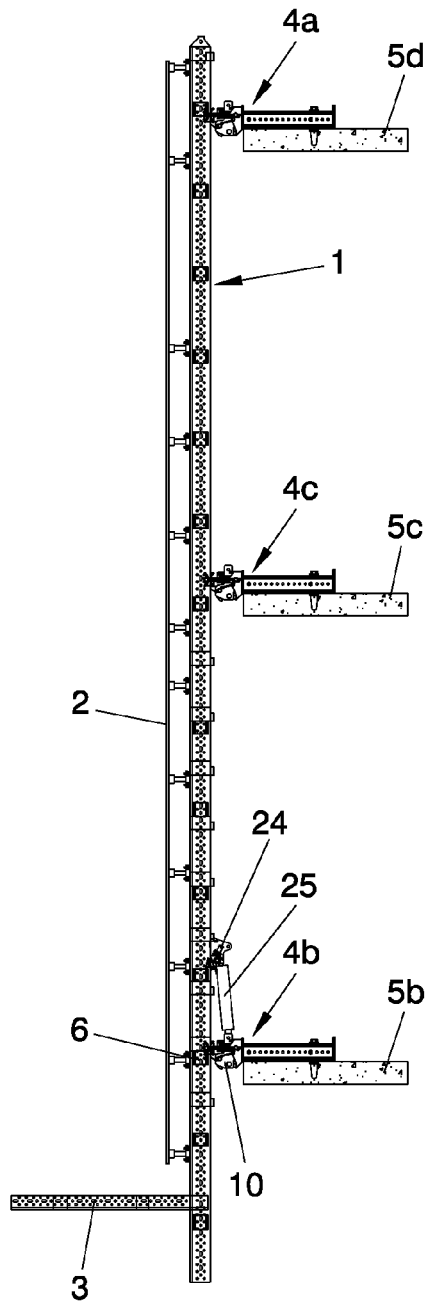
FIG. 6C shows the module illustrated in FIG. 6A at the end of a second phase of the hoisting process.
Figure 6D:
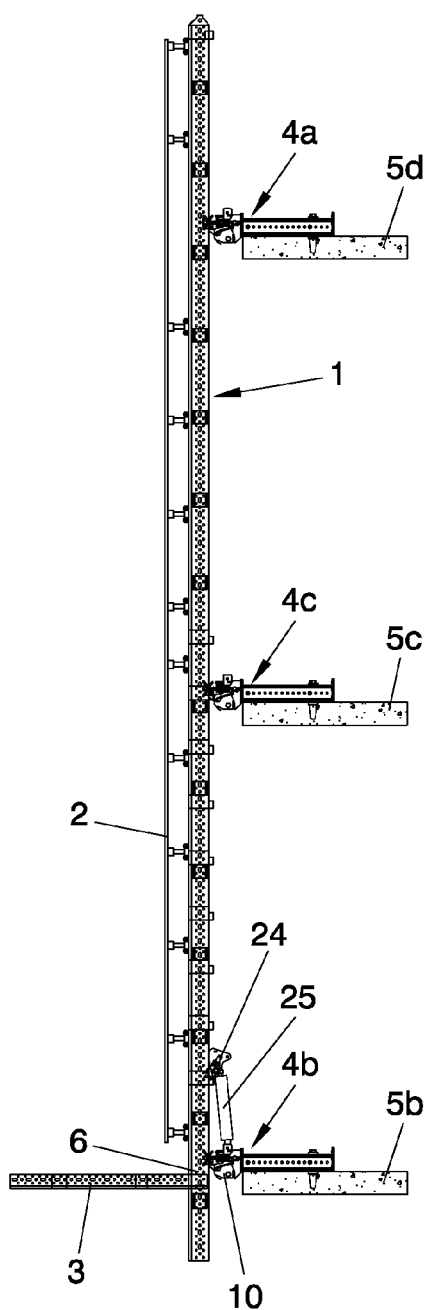
FIG. 6D shows the module illustrated in FIG. 6A in a second working position.
Figure 7:
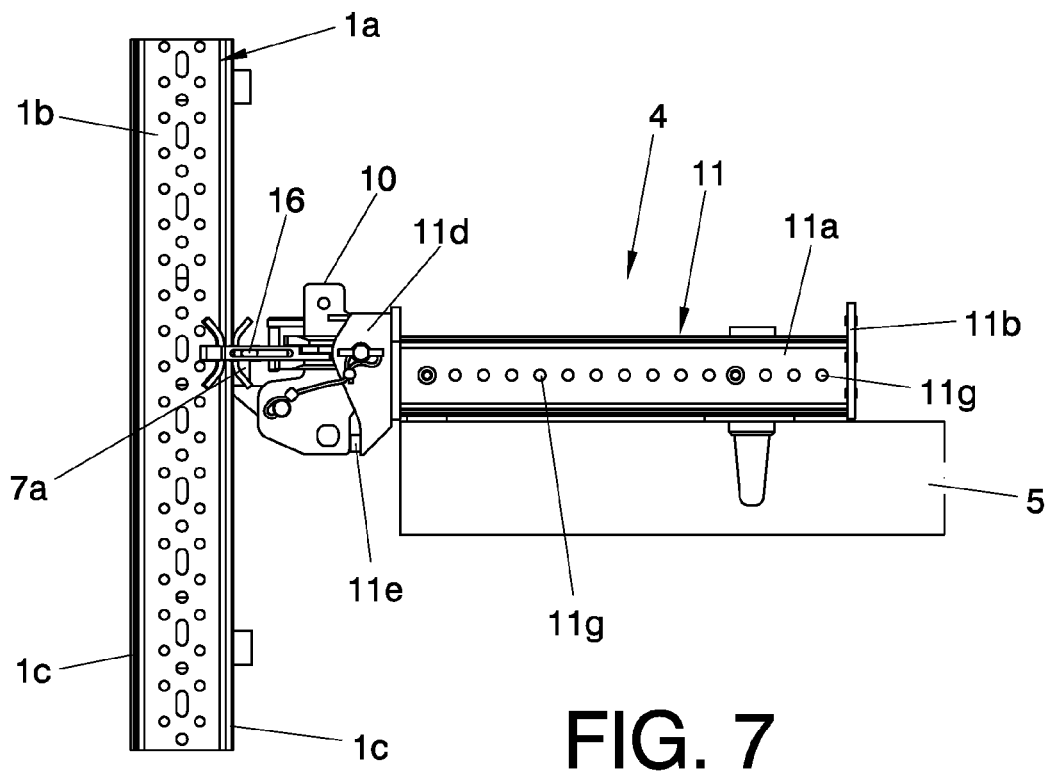
FIG. 7 is a side elevational view of a first embodiment of an anchor according to the present invention.

Therefore when the module is in the working positions shown, for example, in FIGS. 6A and 6C, the protection panel -2- protects the slab -5- which is being built and the last lower two slabs built, in addition to structurally acting as a bracing for the module since it is secured to the two masts and, therefore, confers the necessary rigidity to the module.

The invention claimed is:

1. A self-climbing perimetric protection system for construction works in buildings, said system comprising at least one module comprising:

at least two masts spaced apart from one another, each mast of the at least two masts being formed by a first vertical channel iron and a second vertical channel iron, wherein the first and the second vertical channel irons respectively have a U-shaped cross section comprising a central section and a pair of side sections, wherein a first mast of the at least two masts is constructed such that said central section of the first vertical channel iron of the first mast faces said central section of the second vertical channel iron of the first mast, and the pair of side sections of the first vertical channel iron of the first mast extends opposite to the pair of side sections of the second vertical channel iron of the first mast, and wherein a second mast of the at least two masts is constructed such that said central section of the first vertical channel iron of the second mast faces said central section of the second vertical channel iron of the second mast, and the pair of side sections of the first vertical channel iron of the second mast extends opposite to the pair of side sections of the second vertical channel iron of the second mast;

a vertical protection panel attached to the at least two masts;

a plurality of pairs of support elements arranged in different horizontal planes between the first and the second vertical channel irons of the first and the second masts of the at least two masts for supporting the at least two masts during a phase of a hoisting process for hoisting the at least two masts and during a working phase;

a plurality of pairs of anchors configured to be immobilized at different heights in a building in which the system is used, so that the plurality of pairs of anchors guide the at least two masts, wherein each anchor of the plurality of pairs of anchors comprises:

an anchoring frame; and a guiding head coupled to the anchoring frame, wherein the guiding head comprises:

a pair of mobile horizontal claws, wherein, in a closed position, a first mobile horizontal claw of the pair of mobile horizontal claws braces one side section of the pair of side sections of the first vertical channel iron, which is adjacent to the guiding head, of a respective one mast of the at least two masts, and a second mobile horizontal claw of the pair of mobile horizontal claws braces one side section of the pair of side sections of the second vertical channel iron, which is adjacent to the guiding head, of the one mast of the at least two masts;

a bearing rocker comprising a front part adjacent to the one mast of the at least two masts to which the guiding head is braced, an intermediate part traversed by a horizontal rotation shaft, and a rear part, the bearing rocker being configured to rotate in a vertical plane between a working position, in which said front part supports one support element of the plurality of pairs of support elements that is adjacent to the guiding head, and a release position, in which said front part is positioned from the one of the at least two masts to which the guiding head is braced, to allow at least the one support element of the plurality of pairs of support elements that is adjacent to the guiding head to pass during the hoisting process;

a stop element, wherein, when in the working position, the rear part of the bearing rocker abuts against the stop element; and a pair of side plates which are attached to one another by an upper horizontal plate and a lower horizontal plate located in respective horizontal recesses of the pair of side plates;

wherein each mobile horizontal claw of the pair of mobile horizontal claws comprises a first end part, the first and second mobile horizontal claws being articulated with one another at a common vertical rotation shaft, wherein the common vertical rotation shaft traverses a vertical opening in said upper horizontal plate, a vertical opening in said lower horizontal plate, and a vertical opening in said first end part of each of said first and second mobile horizontal claws;

each mobile horizontal claw of the pair of mobile horizontal claws further comprising a central part having a vertical through-hole, the vertical through-holes of the first and second mobile horizontal claws capable of being aligned and traversed by a vertical locking element which keeps the pair of mobile horizontal claws in the closed position;

each mobile horizontal claw of the pair of mobile horizontal claws further comprising a free second end part, the free second end parts of the pair of mobile horizontal claws being configured to brace the one side section of each of the pair of vertical channel irons of the one mast of the at least two masts that is adjacent to the guiding head when the pair of mobile horizontal claws is in the closed position, thus forming a guidance passage for a vertical movement of the one of the at least two masts;

wherein at least one pair of anchors of the plurality of pairs of anchors is arranged in a horizontal plane, and the guiding heads of the at least one pair of anchors hold onto said at least two masts when in said hoisting process and when in the working phase.

2. The system according to claim 1, wherein each side plate of the pair of side plates comprises an opening, and wherein the anchoring frame comprises a pair of vertical lugs having openings, the pair of vertical lugs being coupled to the side plates of the guiding head by a connecting bolt traversing straight through the openings in each of the pair of side plates and in each of the pair of vertical lugs.

3. The system according to claim 2, wherein each side plate of the pair of side plates comprises a rear projecting part, and wherein the connecting bolt traverses the respective rear projecting part of each side plate of the pair of side plates.

4. The system according to claim 3, wherein the pair of vertical lugs externally brace the rear projecting parts of each side plate of the pair of side plates.

5. The system according to claim 4, wherein each of the pair of vertical lugs comprises an upper edge, which abuts upon a bearing rib laterally emerging from each side plate of the pair of side plates, wherein each of the pair of vertical lugs further comprises a lower part that inclines backwards, wherein a horizontal locking stop is attached across each lower part of the pair of vertical lugs, said horizontal locking stop abutting upon rear lower sections of the pair of side plates.

6. The system according to claim 1, wherein the common vertical rotation shaft and the vertical locking element for the pair of mobile horizontal claws are respectively a first arm and a second arm of a double bolt.

7. The system according to claim 6, wherein the free second end part of the first mobile horizontal claw is provided with a vertical notch in which the one of the side sections of the first vertical channel iron is housed, and the free second end part of the second mobile horizontal claw is provided with a vertical notch in which the one of the side sections of the second vertical channel iron is housed, in said closed position.

8. The system according to claim 1, wherein, in the at least one module:

each side plate of the pair of side plates of the guiding head respectively comprises a front projecting part emerging in a direction toward the one of the side sections of the first vertical channel iron and the one of the side sections of the second vertical channel iron, and the horizontal rotation shaft of the bearing rocker is arranged therebetween;

in said working position of the bearing rocker, the front part of the bearing rocker at least partially projects horizontally from the front projecting parts of said pair of side plates between said pair of mobile horizontal claws; and each support element of the plurality of pairs of support elements comprises a horizontal projection configured, in said working position, to rest on the front part of the bearing rocker and to thrust said front part upwardly during said hoisting process for hoisting the at least two masts.

9. The system according to claim 1, wherein, in the at least one module, the rear part of the bearing rocker is urged by a tension spring anchored to an inclined central rib between the pair of side plates.

10. The system according to claim 1 further comprising a self-climbing device that is adapted to coupled to the one of the at least two masts and to one anchor of the plurality of pairs of anchors arranged in horizontal planes, to which the at least two masts are braced, during at least one phase of the hoisting process for hoisting the at least two masts.

11. The system according to claim 10, wherein the self-climbing device comprises:

a pair of climbing heads; and a pair of hoist cylinders which are extensible from a retracted position to an extended position, wherein each hoist cylinder of the pair of hoist cylinders corresponds to one climbing head of the pair of climbing heads;

wherein each climbing head of the pair of climbing heads is articulated to an upper end of the corresponding hoist cylinder;

wherein a lower end of each hoist cylinder of the pair of hoist cylinders is articulated to a respective guiding head of said guiding heads;

wherein each climbing head further comprises two vertical contact plates, spaced from one another and attached at their lower ends to an attachment plate;

wherein a rotation shaft, about which a climbing rocker rotates, is arranged between the lower ends of the two vertical contact plates, and wherein the climbing rocker comprises a front part and a rear part, the climbing rocker being adapted to pivot between a hoist position, in which the rear part of the climbing rocker abuts with a first limiting element arranged between the vertical contact plates and in which the front part of the climbing rocker supports one of the support elements when each hoist cylinder of the pair of hoist cylinders extends towards said extended position during the hoisting process, and a retracted position, in which the climbing rocker rotates upwardly allowing passage of at least one of the support elements when each hoist cylinder of the pair of hoist cylinders is retracted to said retracted position; and the attachment plate comprises a first side wing which prolongs frontally into a fixed claw and houses a vertical articulation shaft in which a mobile claw moves, and a second side wing which houses an extractable locking pin which passes through the mobile claw and locks the mobile claw in the closed position.

12. The system according to claim 11, wherein each vertical contact plate comprises a front edge facing the one of the at least two masts, with a first convex upper section and a second inclined section extending backwards between the first section and the attachment plate; and wherein the vertical contact plates have respective protuberances with respective coupling openings for a coupling bolt to which the upper end of the corresponding hoist cylinder is coupled.

* * * * *